US012807741B2

(12) United States Patent
O'Hare et al.

(10) Patent No.: US 12,807,741 B2
(45) Date of Patent: Nov. 24, 2026

(54) CATALYSTS

(71) Applicant: OXFORD UNIVERSITY INNOVATION LIMITED, Oxford (GB)

(72) Inventors: Dermot O'Hare, Oxford (GB); Jean-Charles Buffet, Oxford (GB); Zoe Turner, Oxford (GB); Clement Collins Rice, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 583 days.

(21) Appl. No.: 18/558,370

(22) PCT Filed: May 6, 2022

(86) PCT No.: PCT/GB2022/051160

§ 371 (c)(1),
(2) Date: Nov. 1, 2023

(87) PCT Pub. No.: WO2022/234292

PCT Pub. Date: Nov. 10, 2022

(65) Prior Publication Data

US 2024/0239925 A1 Jul. 18, 2024

(30) Foreign Application Priority Data

May 7, 2021 (GB) ...................................... 2106576

(51) Int. Cl.
*C08F 4/64* (2006.01)
*C07F 17/00* (2006.01)
(Continued)

(52) U.S. Cl.
CPC .............. *C08F 10/02* (2013.01); *C07F 17/00* (2013.01); *C08F 4/6192* (2013.01); *C08F 4/64068* (2013.01); *C08F 4/76* (2013.01)

(58) Field of Classification Search
CPC ...... C08F 4/64068; C08F 4/6192; C08F 4/76; C08F 10/02; C08F 110/02; C08F 210/165; C07F 17/00
See application file for complete search history.

(56) References Cited

U.S. PATENT DOCUMENTS

| | | |
|---|---|---|
| 5,420,217 A | 5/1995 | Canich |
| 5,723,560 A | 3/1998 | Canich |

(Continued)

FOREIGN PATENT DOCUMENTS

| | | |
|---|---|---|
| TW | 201829432 A | 8/2018 |
| TW | 201829440 A | 8/2018 |

(Continued)

OTHER PUBLICATIONS

Williams, T.J.; Lamb, J.V.; Buffet, J.-C.; Khamnaen, T.; O'Hare, D. RCS Advances 2021, 11, 5644-5650. (Year: 2021).*

(Continued)

*Primary Examiner* — Rip A Lee
(74) *Attorney, Agent, or Firm* — Thomas|Horstemeyer, LLP

(57) ABSTRACT

Compounds suitable for use in the polymerisation of olefins, such as ethylene, are described. Also described is a process for polymerising olefins using the described compounds. The compounds exhibit high polymerisation activities and afford polyolefins having industrially desirable properties, including high molecular weight and low polydispersity.

20 Claims, 22 Drawing Sheets

$^{Me2}SB(^{tBu,Me}ArO,Ind)TiCl_2$
"indenyl-PHENICS"

(51) Int. Cl.

| | |
|---|---|
| ***C08F 4/76*** | (2006.01) |
| ***C08F 10/02*** | (2006.01) |
| *C08F 4/6192* | (2006.01) |

(56) References Cited

U.S. PATENT DOCUMENTS

| | | | | |
|---|---|---|---|---|
| 5,747,614 | A * | 5/1998 | Takeuchi | C08F 12/04 526/170 |
| 8,980,781 | B2 * | 3/2015 | O'Hare | C08F 110/02 502/103 |
| 9,884,925 | B2 * | 2/2018 | O'Hare | C08F 10/02 |
| 11,053,269 | B2 * | 7/2021 | O'Hare | C08F 10/02 |
| 2015/0218292 | A1 * | 8/2015 | O'Hare | B01J 31/2295 556/53 |
| 2017/0313793 | A1 * | 11/2017 | O'Hare | C08F 10/02 |
| 2019/0135953 | A1 * | 5/2019 | O'Hare | C07F 17/00 |
| 2019/0135954 | A1 * | 5/2019 | O'Hare | C08F 10/02 |
| 2024/0368317 | A1 * | 11/2024 | O'Hare | C08F 110/06 |

FOREIGN PATENT DOCUMENTS

| | | | | |
|---|---|---|---|---|
| WO | WO-9501378 | A1 * | 1/1995 | C08F 12/04 |
| WO | WO-9514024 | A1 * | 5/1995 | C08F 10/00 |
| WO | 2005/097838 | A1 | 10/2005 | |
| WO | WO-2011051705 | A1 * | 5/2011 | C08F 110/02 |
| WO | 2017/216551 | A1 | 12/2017 | |
| WO | 2019/038605 | A1 | 2/2019 | |

OTHER PUBLICATIONS

Ransom, P.; Ashley, A.E.; Brown, N.D.; Thompson, A.L.; O'Hare, D. Organometallics 2011, 30, 800-814. (Year: 2011).*

Williams, T.J.; Buffet, J.-C.; Turner, Z.R.; O'Hare, D. Catal. Sci. Technol. 2018, 8, 5454-5461. (Year: 2018).*

International Search Report and Written Opinion for WO 2022/234292 (PCT/GB2022/051160), dated Sep. 19, 2022, pp. 1-15.

UK Search Report for GB 2106576.8, dated Nov. 8, 2021, pp. 1-2.

Collins Rice Clement G. et al.: "Supported permethylindenyl titanium catalysts for the synthesis of disentangled ultra-high molecular weight polyethylene (dis UHMWPE)", Chemical Communications, vol. 57, No. 69, Aug. 9, 2021 (Aug. 9, 2021), pp. 8600-8603.

Macromolecules, 2010, vol. 43, Senda T. et.al., pp. 2299-2306, see Scheme I (note compound 4a) showing Benzo-fused Indenyl compound for preparing polyolefins and copolymers.

Shriver D. F. and Drezdon M. A., The Manipulation of Air-Sensitive Compounds, 2 edn., Wiley, 1986.

Cosier, J and Glazer, Am; J. Appl. Crystallogr., 1986, 19, 105-107.

Altomare,A et al; J. Appl. Crystallogr., 1993, 26, 343-350.

Palatinus, L and Chapuis, G; J. Appl. Crystallogr., 2007, 40, 786-790.

Farrugia, L; J. Appl. Crystallogr., 1999, 32, 837-838.

Spek, A L; J. Appl. Crystallogr., 2003, 36, 7-13.

Farrugia, L J; J. Appl. Crystallogr., 2012, 45, 849-854.

Görl, C et al; Polyhedron, 2016, 118, 37-51.

Forte et al; Int. J. Polym. Sci., 2017, 2017, 1.

Fu, J et al; Int. J. Polym. Sci. Polymer, 2010, 51, 2721.

Hussain, m et al; Int. J. Polym. Sci., Polymers, 2020, 12, 323.

Rastogi, S et al; J. Phys .: Condens. Matter, 2007, 19, 205122.

Wrona, M et al; Clin. Orthop. Relat. Res., 1994, 299, 92.

Mitani et al. J. Am. Chem. Soc., 2002, 124, 3327.

Heidari, A et al; Iran. Polym. J., 2018, 27, 701.

Shamiri, a et al; Materials, 2014, 7, 5069.

Busico, V et al; J. Mol. Catal. A: Chem., 1998, 128, 53.

Brintzinger H et al ; Angew. Chem. Int. Ed. Engl., 1995, 34, 1143.

Resconi, L et al; Organometallics, 1996, 15, 998.

Okuda, J et al; Chem. Ber., 1990, 123, 1649-1651.

Nabika, M et al; Organometallics, 2009, 28, 3785-3792.

Senda, T et al; Macromolecules, 2010, 43, 2299-2306.

Miyatake et al., Polym. J., 1989, 21, 809-814.

* cited by examiner $^{Me2}$SB($^{tBu,Me}$ArO,Ind)TiCl$_2$
"indenyl-PHENICS"

$^{Me2}$SB($^{tBu,Me}$ArO,Ind)TiCl$_2$
"indenyl-PHENICS"

| | |
|---|---|
| Ti(1)–O(1) | 1.7838(1) |
| Ti(1)–I*$_{CENT}$ | 2.0156(1) |
| C(1)–Si(1)–C(23) | 107.07(1) |
| I*$_{CENT}$–Ti(1)–O(1) | 114.16(1) |
| C(1)–Si(1)–C(23)–C(18) | 35.89(1) |
| Ti(1)–O(1)–C(18)–C(23) | 27.86(1) |
| I*–ArO | 48.57 |

CATALYSTS

CROSS-REFERENCE TO RELATED APPLICATIONS

This application is the National Stage of International Application No. PCT/GB2022/051160, filed May 6, 2022, which claims priority to GB 2106576.8, filed May 7, 2021, which are entirely incorporated herein by reference.

INTRODUCTION

The present invention relates to new compounds suitable for use as catalysts in the polymerisation of olefins, such as ethylene. The present invention also relates to the use of the compounds in a process for the polymerisation of olefins, such as ethylene.

BACKGROUND OF THE INVENTION

It is known that ethylene (and α-olefins in general) can be readily polymerised at low or medium pressures in the presence of certain transition metal catalysts. These catalysts are generally known as Zeigler-Natta type catalysts.

A particular group of these Ziegler-Natta type catalysts, which catalyse the polymerisation of ethylene (and α-olefins in general), comprise a metallocene transition metal catalyst often in combination with an aluminoxane activator. Metallocenes comprise a metal bound between two $\eta^5$-cyclopentadienyl type ligands.

In spite of recent developments in metallocene and post-metallocene chemistry, there remains a need for improved catalysts for use in olefin, in particular ethylene, polymerisation reactions. In particular, there remains a need for new catalysts having increased activity, improved comonomer incorporation, and/or the ability to impart desirable properties (e.g. high molecular weight, low polydispersity, etc.) to the resulting polyolefin.

The present invention was devised with the foregoing in mind.

SUMMARY OF THE INVENTION

According to a first aspect of the present invention there is provided a compound having a structure according to Formula I shown below:

(I)

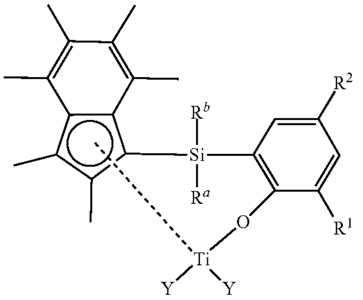

wherein $R^1$ and $R^2$ are each independently selected from the group consisting of hydrogen, (1-6C)alkyl, (1-6C)haloalkyl, (1-6C)alkoxy, (2-6C)alkenyl, (2-6C)alkynyl, —$NR^3R^4$ and —$(O)_n$—$(CR^5R^6)_m$—$R^7$, where n is 0 or 1, m is 0 or 1, $R^3$ and $R^4$ are independently selected from hydrogen and (1-3C)alkyl, $R^5$ and $R^6$ are each independently hydrogen or (1-2C)alkyl, and $R^7$ is selected from the group consisting of aryl, heteroaryl, carbocyclyl and heterocyclyl, and where each $R^7$ is independently optionally substituted with one or more groups $R^3$ selected from the group consisting of halo, hydroxy, (1-4C)alkyl, (1-4C)haloalkyl and (1-3C)alkoxy;

$R^a$ and $R^b$ are each independently selected from (1-4C) alkyl, (2-4C)alkenyl and aryl; and each Y is independently selected from the group consisting of hydride, halo, (1-5C)alkyl, (1-5C)alkoxy, —$(CH_2)_pSi(R^9)_3$, —$NR^{10}R^{11}$, and —$(O)_q$—$(CR^{12}R^{13})_r$—$R^{14}$, where p is 1 or 2, q is 0 or 1, r is 0 or 1, each $R^9$ is independently (1-3C)alkyl, $R^{10}$ and $R^{11}$ are independently selected from hydrogen and (1-3C) alkyl, $R^{12}$ and $R^{13}$ are independently selected from hydrogen and (1-2C)alkyl, and $R^{14}$ is selected from the group consisting of aryl, heteroaryl, carbocyclyl and heterocyclyl, and where each $R^{14}$ is independently optionally substituted with one or more groups $R^{15}$ selected from the group consisting of halo, hydroxy, (1-4C)alkyl, (1-4C)haloalkyl and (1-3C)alkoxy.

According to a second aspect of the present invention there is provided a compound having a structure according to Formula I shown below:

(I)

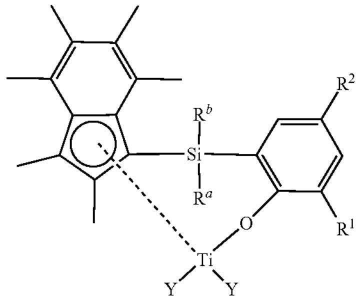

wherein $R^1$ and $R^2$ are each independently selected from the group consisting of hydrogen, (1-6C)alkyl, (1-6C)haloalkyl, (1-6C)alkoxy, (2-6C)alkenyl, (2-6C)alkynyl, —$NR^3R^4$ and —$(O)_n$—$(CR^5R^6)_m$—$R^1$, where n is 0 or 1, m is 0 or 1, $R^3$ and $R^4$ are independently selected from hydrogen and (1-3C)alkyl, $R^5$ and $R^6$ are each independently hydrogen or (1-2C)alkyl, and $R^7$ is selected from the group consisting of aryl, heteroaryl, carbocyclyl and heterocyclyl, and where each $R^7$ is independently optionally substituted with one or more groups $R^3$ selected from the group consisting of halo, hydroxy, (1-4C)alkyl, (1-4C)haloalkyl and (1-3C)alkoxy;

$R^a$ and $R^b$ are each independently selected from (1-4C) alkyl and (2-4C)alkenyl; and each Y is independently selected from the group consisting of hydride, halo, (1-5C)alkyl, (1-5C)alkoxy, —$(CH_2)_pSi(R^9)_3$, —$NR^{10}R^{11}$, and —$(O)_q$—$(CR^{12}R^{13})_r$—$R^{14}$, where p is 1 or 2, q is 0 or 1, r is 0 or 1, each $R^9$ is independently (1-3C)alkyl, $R^{10}$ and $R^{11}$ are independently selected from hydrogen and (1-3C) alkyl, $R^{12}$ and $R^{13}$ are independently selected from hydrogen and (1-2C)alkyl, and $R^{14}$ is selected from the group consisting of aryl, heteroaryl, carbocyclyl and heterocyclyl, and where each $R^{14}$ is independently optionally substituted with one or more groups $R^{15}$ selected from the group consisting of halo, hydroxy, (1-4C)alkyl, (1-4C)haloalkyl and (1-3C)alkoxy.

According to a third aspect of the present invention there is provided a process for the preparation of a polyolefin, the process comprising contacting at least one olefin with a compound of Formula I as defined herein.

DETAILED DESCRIPTION OF THE INVENTION

Definitions

The term "(m-nC)" or "(m-nC) group" used alone or as a prefix, refers to any group having m to n carbon atoms.

In this specification the term "alkyl" includes both straight and branched chain alkyl groups. References to individual alkyl groups such as "propyl" are specific for the straight chain version only and references to individual branched chain alkyl groups such as "isopropyl" are specific for the branched chain version only. For example, "(1-6C)alkyl" includes (1-4C)alkyl, (1-3C)alkyl, propyl, isopropyl and t-butyl.

The term "alkenyl" refers to straight and branched chain alkyl groups comprising 2 or more carbon atoms, wherein at least one carbon-carbon double bond is present within the group. Examples of alkenyl groups include ethenyl, propenyl and but-2,3-enyl and includes all possible geometric (E/Z) isomers.

The term "alkynyl" refers to straight and branched chain alkyl groups comprising 2 or more carbon atoms, wherein at least one carbon-carbon triple bond is present within the group. Examples of alkynyl groups include acetylenyl and propynyl.

The term "alkoxy" refers to O-linked straight and branched chain alkyl groups. Examples of alkoxy groups include methoxy, ethoxy and t-butoxy.

The term "haloalkyl" is used herein to refer to an alkyl group in which one or more hydrogen atoms have been replaced by halogen (e.g. fluorine) atoms. Often, haloalkyl is fluoroalkyl. Examples of haloalkyl groups include $—CH_2F$, $—CHF_2$ and $—CF_3$. Most often, haloalkyl is $—CF_3$.

The term "halo" or "halogeno" refers to fluoro, chloro, bromo and iodo, suitably fluoro, chloro and bromo, more suitably, fluoro and chloro. Most suitably, halo is chloro.

The term "carbocyclyl", "carbocyclic" or "carbocycle" means a non-aromatic saturated or partially saturated monocyclic, fused, bridged, or spiro bicyclic carbon-containing ring system(s).

Examples of carbocyclic groups include cyclopropyl, cyclobutyl, cyclohexyl, cyclohexenyl and spiro[3.3]heptanyl.

The term "heterocyclyl", "heterocyclic" or "heterocycle" means a non-aromatic saturated or partially saturated monocyclic, fused, bridged, or spiro bicyclic heterocyclic ring system(s) incorporating one or more (for example 1-4, particularly 1, 2 or 3) heteroatoms selected from nitrogen, oxygen or sulfur. Examples of heterocycles include azetidinyl, pyrrolidinyl, piperidinyl, piperazinyl, tetrahydrotriazinyl, tetrahydropyrazolyl, and the like.

The term "aryl" or "aromatic" as used herein means an aromatic ring system comprising 6, 7, 8, 9 or 10 ring carbon atoms. Aryl is often phenyl but may be a polycyclic ring system, having two or more rings, at least one of which is aromatic. This term includes reference to groups such as phenyl, naphthyl and the like.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. Examples of five membered heteroaryl groups include but are not limited to pyrrolyl, furanyl, thienyl, imidazolyl, furazanyl, oxazolyl, oxadiazolyl, oxatriazolyl, isoxazolyl, thiazolyl, isothiazolyl, pyrazolyl, triazolyl and tetrazolyl groups. Examples of six membered heteroaryl groups include but are not limited to pyridyl, pyrazinyl, pyridazinyl, pyrimidinyl and triazinyl.

The term "substituted" as used herein in reference to a moiety means that one or more, especially up to 5, of the hydrogen atoms in said moiety are replaced independently of each other by the corresponding number of the described substituents. Preferably, "substituted" as used herein in reference to a moiety means that 1, 2 or 3, of the hydrogen atoms in said moiety are replaced independently of each other by the corresponding number of the described substituents. Even more preferred, "substituted" as used herein in reference to a moiety means that 1 or 2, of the hydrogen atoms in said moiety are replaced independently of each other by the corresponding number of the described substituents. The term "optionally substituted" as used herein means substituted or unsubstituted.

It will, of course, be understood that substituents may only be at positions where they are chemically possible, the person skilled in the art being able to decide (either experimentally or theoretically) without inappropriate effort whether a particular substitution is possible.

Throughout the entirety of the description and claims of this specification, where subject matter is described herein using the term "comprise" (or "comprises" or "comprising"), the same subject matter instead described using the term "consist of" (or "consists of" or "consisting of") or "consist essentially of" (or "consists essentially of" or "consisting essentially of") is also contemplated.

Throughout the description and claims of this specification, the singular encompasses the plural unless the context otherwise requires. In particular, where the indefinite article is used, the specification is to be understood as contemplating plurality as well as singularity, unless the context requires otherwise.

Features described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any of the specific embodiments recited herein. The invention extends to any novel one, or any novel combination, of the features disclosed in this specification (including any accompanying claims, abstract and drawings), or to any novel one, or any novel combination, of the steps of any method or process so disclosed.

Unless otherwise specified, where the quantity or concentration of a particular component of a given product is specified as a weight percentage (wt. % or % w/w), said weight percentage refers to the percentage of said component by weight relative to the total weight of the product as a whole. It will be understood by those skilled in the art that the sum of weight percentages of all components of a product will total 100 wt. %. However, where not all components are listed (e.g. where a product is said to "comprise" one or more particular components), the weight percentage balance may optionally be made up to 100 wt % by unspecified ingredients.

Compounds of Formula (I)

According to a first aspect of the present invention there is provided a compound having a structure according to Formula I shown below:

(I)

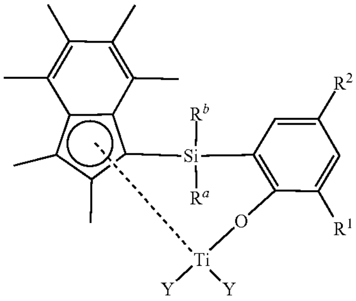

wherein

- $R^1$ and $R^2$ are each independently selected from the group consisting of hydrogen, (1-6C)alkyl, (1-6C)haloalkyl, (1-6C)alkoxy, (2-6C)alkenyl, (2-6C)alkynyl, $—NR^3R^4$ and $—(O)_n—(CR^5R^6)_m—R^7$, where n is 0 or 1, m is 0 or 1, $R^3$ and $R^4$ are independently selected from hydrogen and (1-3C)alkyl, $R^5$ and $R^6$ are each independently hydrogen or (1-2C)alkyl, and $R^7$ is selected from the group consisting of aryl, heteroaryl, carbocyclyl and heterocyclyl, and where each $R^7$ is independently optionally substituted with one or more groups $R^8$ selected from the group consisting of halo, hydroxy, (1-4C)alkyl, (1-4C)haloalkyl and (1-3C)alkoxy;
- $R^a$ and $R^b$ are each independently selected from (1-4C) alkyl, (2-4C)alkenyl and aryl; and each Y is independently selected from the group consisting of hydride, halo, (1-5C)alkyl, (1-5C)alkoxy, $—(CH_2)_p Si(R^9)_3$, $—NR^{10}R^{11}$, and $—(O)_q—(CR^{12}R^{13})_r—R^{14}$, where p is 1 or 2, q is 0 or 1, r is 0 or 1, each $R^9$ is independently (1-3C)alkyl, $R^{10}$ and $R^{11}$ are independently selected from hydrogen and (1-3C)alkyl, $R^{12}$ and $R^{13}$ are independently selected from hydrogen and (1-2C)alkyl, and $R^{14}$ is selected from the group consisting of aryl, heteroaryl, carbocyclyl and heterocyclyl, and where each $R^{14}$ is independently optionally substituted with one or more groups $R^{15}$ selected from the group consisting of halo, hydroxy, (1-4C)alkyl, (1-4C)haloalkyl and (1-3C)alkoxy.

Through rigorous investigations, the inventors have devised new compounds that serve as highly attractive procatalysts in the polymerisation of olefins, in particular ethylene. When compared with recent developments in the post-metallocene field, the compounds of the invention deliver the dual benefit of increased olefin polymerisation activity and industrially attractive polyolefin characteristics, including high molecular weight and low polydispersity.

The following passages discuss the compounds of Formula (I) in more detail and are applicable to both the first and second aspects of the invention.

$R^1$ and $R^2$ may each independently selected from the group consisting of hydrogen, (1-5C)alkyl, (1-5C)alkoxy and $—(O)_n—(CR^5R^6)_m—R^7$. Suitably, $R^1$ and $R^2$ are each independently selected from the group consisting of hydrogen, (1-4C)alkyl and $—(O)_n—(CR^5R^6)_m—R^7$.

$R^7$ may be selected from the group consisting of aryl and heteroaryl. Suitably, $R^7$ is selected from the group consisting of phenyl and 5-6 membered heteroaryl, wherein said 5-6 membered heteroaryl contains 1 or 2 nitrogen heteroatoms. Most suitably, $R^7$ is phenyl. $R^7$ may be independently optionally substituted with one or more groups $R^8$.

$R^8$ may be selected from the group consisting of halo and (1-3C)alkyl.

In particular embodiments, $R^1$ and $R^2$ are each independently selected from the group consisting of hydrogen, methyl, tert-butyl and $—C(CH_3)_2Ph$, where Ph denotes phenyl. Suitably, $R^1$ and $R^2$ are each independently selected from the group consisting of methyl, tert-butyl and $—C(CH_3)_2Ph$. Particular non-limiting examples include: (i) $R^1$ is tert-butyl and $R^2$ is methyl; (ii) $R^1$ and $R^2$ are both tert-butyl; and (iii) $R^1$ and $R^2$ are both $—C(CH_3)_2Ph$, of which example (ii) is especially suitable.

$R^a$ and $R^b$ may be independently selected from (1-3C) alkyl and aryl, particular examples of which include methyl, n-propyl and phenyl. For example, $R^a$ and $R^b$ may be methyl and methyl respectively, or methyl and n-propyl respectively, or methyl and phenyl respectively.

$R^a$ and $R^b$ may be independently selected from (1-3C) alkyl, particular examples of which include methyl and n-propyl. Suitably, both $R^a$ and $R^b$ are identical. More suitably, $R^a$ and $R^b$ are both methyl.

Each Y may be independently selected from the group consisting of hydride, chloro, bromo, iodo, (1-3C)alkyl, (1-3C)alkoxy, $—(CH_2)_pSi(R^9)_3$, $—NR^{10}R^{11}$, and $—(O)_q—(CR^{12}R^{13})_r—R^{14}$.

Suitably, p is 1 and $R^9$ is methyl.

$R^{10}$ and $R^{11}$ may be independently selected from (1-3C) alkyl, in particular methyl.

$R^{12}$ and $R^{13}$ may be hydrogen.

$R^{14}$ may be selected from the group consisting of aryl and heteroaryl. Suitably, $R^{14}$ is selected from the group consisting of phenyl and 5-6 membered heteroaryl, wherein said 5-6 membered heteroaryl contains 1 or 2 nitrogen heteroatoms. Most suitably, $R^{14}$ is phenyl. $R^{14}$ may be independently optionally substituted with one or more groups $R^{15}$, each of which is suitably independently selected from the group consisting of (1-4C)alkyl.

Particular non-limiting examples of the group $—(O)_q—(CR^{12}R^{13})_r—R^{14}$ include:

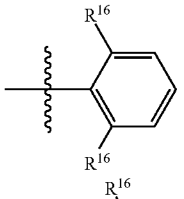

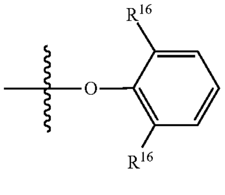

-continued

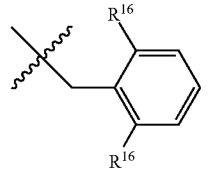

wherein each $R^{16}$ is independently selected from hydrogen and $R^{15}$.

In particular embodiments, each Y is independently selected from the group consisting of chloro, bromo, iodo, methyl, $—CH_2Si(CH_3)_3$, $—N(CH_3)_2$ and —O-2,6-diisopropylphenyl. Suitably, each Y is independently selected from the group consisting of chloro, bromo, iodo and methyl. More suitably, both Y are identical.

In particularly suitable embodiments, Y is chloro.

In certain embodiments, the compound of Formula I has a structure according to Formula I-A shown below:

I-A

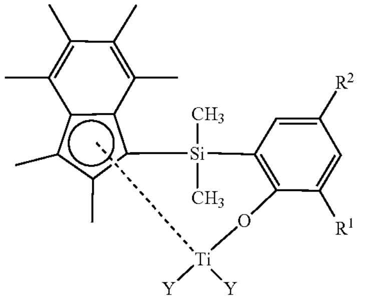

wherein $R^1$, $R^2$ and Y are as defined hereinbefore.

In certain embodiments, the compound of Formula I has a structure according to Formula I-B shown below:

I-B

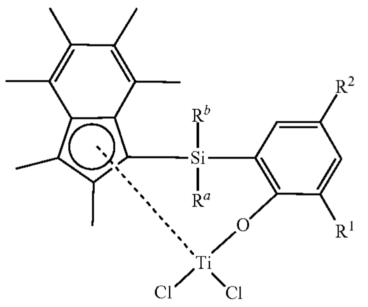

wherein $R^1$, $R^2$, $R^a$ and $R^b$ are as defined hereinbefore.

In certain embodiments, the compound of Formula I has a structure according to Formula I-C shown below:

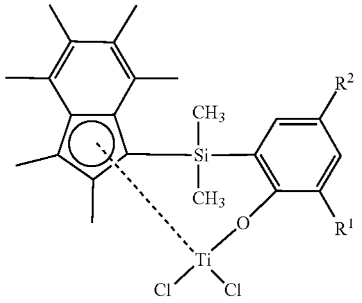

wherein $R^1$ and $R^2$ are as defined hereinbefore.

In certain embodiments, the compound of Formula I has one of the following structures:

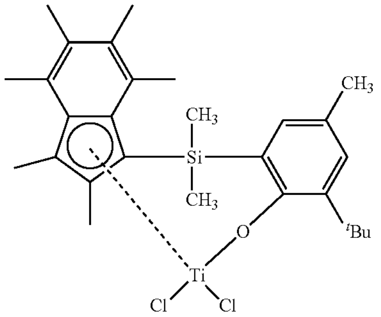

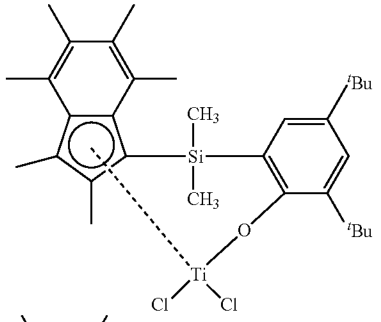

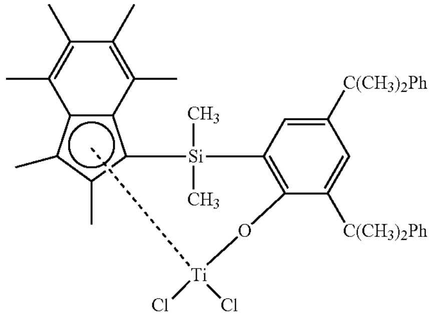

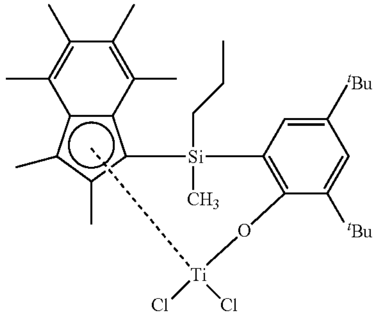

-continued

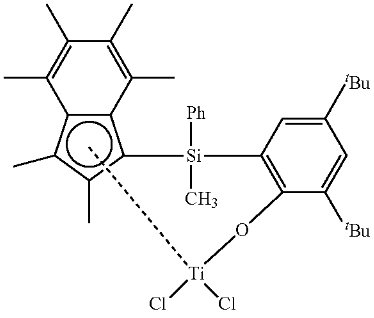

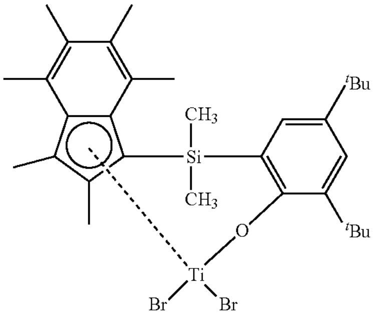

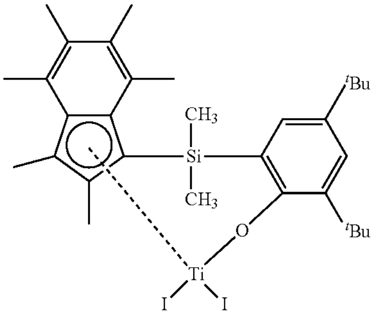

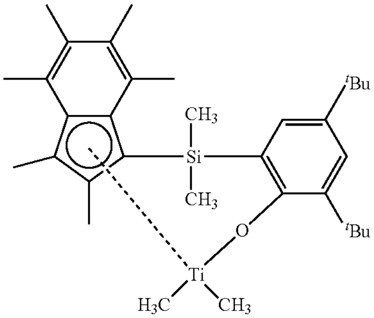

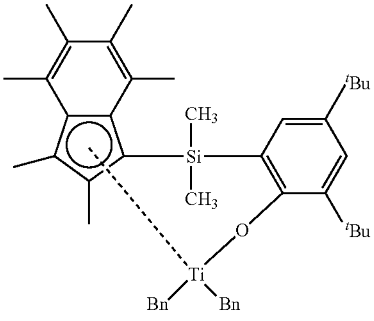

-continued

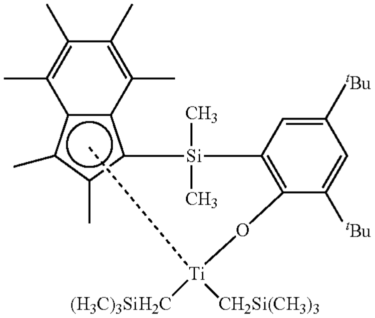

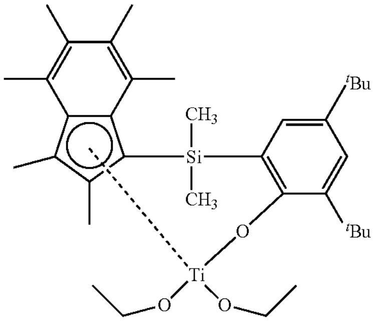

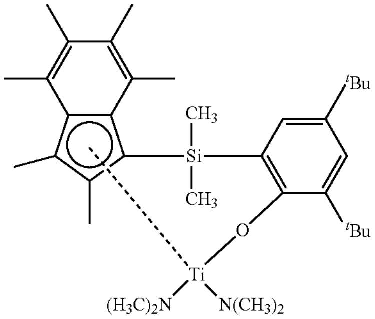

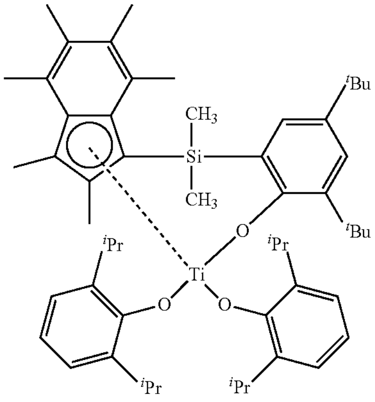

wherein $^t$Bu denotes tert-butyl, $^i$Pr denotes iso-propyl, Ph denotes phenyl and Bn denotes benzyl.

The compound of Formula (I) may be associated with (e.g. immobilised on or supported on) a supporting substrate. Suitably, the supporting substrate is a solid. It will be appreciated that the compound may be immobilised on the supporting substrate by one or more covalent or ionic interactions, either directly, or via a suitable linking moiety. It will be appreciated that minor structural modifications resulting from the immobilisation of the compound of the supporting substrate (e.g. loss of one or both groups, Y) are nonetheless within the scope of the invention.

Suitably, the supporting substrate is selected from solid polymethylaluminoxane, silica-supported methylaluminoxane, alumina, zeolite, layered double hydroxide and layered double hydroxide-supported methylaluminoxane. More suitably, the supporting substrate is selected from solid polymethylaluminoxane, silica-supported methylaluminoxane and layered double hydroxide-supported methylaluminoxane, of which layered double hydroxide-supported methylaluminoxane may be preferred when particularly high molecular weight polyolefins having low polydispersity are sought.

In particular embodiments, the supporting substrate is solid polymethylaluminoxane. The mole ratio of Al in the solid polymethylaluminoxane supporting substrate to metal X in the compound of formula I (i.e. $[Al_{support}]/[X]$) may be 50:1 to 400:1, and is suitably 150:1 to 250:1.

The terms "solid MAO", "sMAO" and "solid polymethylaluminoxane" are used synonymously herein to refer to a solid-phase material having the general formula $-[(Me)AlO]_n-$, wherein n is an integer from 4 to 50 (e.g. 10 to 50). Any suitable solid polymethylaluminoxane may be used.

There exist numerous substantial structural and behavioural differences between solid polymethylaluminoxane and other, conventional MAOs. Perhaps most notably, solid polymethylaluminoxane is distinguished from other MAOs by virtue of its insolubility in many hydrocarbon solvents and so acts as a heterogeneous support system. In contrast to conventional, hydrocarbon-soluble MAOs, which are traditionally used as an activator species in slurry polymerisation or to modify the surface of a separate solid supporting substrate (e.g. $SiO_2$), the solid polymethylaluminoxanes useful as part of the present invention are themselves suitable for use as solid-phase supporting substrates. Hence, solid polymethylaluminoxane supporting substrates used as part of the present invention are devoid of any other species that could be considered a solid supporting substrate (e.g. inorganic material such as $SiO_2$, $Al_2O_3$ and $ZrO_2$). Moreover, given the dual function of the solid polymethylaluminoxane (as catalytic supporting substrate and activator species), compounds of the invention supported on solid polymethylaluminoxane may not require the presence of an additional catalytic activator species (e.g. TIBA) when used in olefin polymerisation reactions.

Solid polymethylaluminoxane may be prepared by heating a solution containing MAO and a hydrocarbon solvent (e.g. toluene), so as to precipitate solid polymethylaluminoxane. The solution containing MAO and a hydrocarbon solvent may be prepared by reacting trimethyl aluminium and benzoic acid in a hydrocarbon solvent (e.g. toluene), and then heating the resulting mixture.

The aluminium content of the solid polymethylaluminoxane suitably falls within the range of 30-50 wt %, and is suitably 36-41 wt %.

The solid polymethylaluminoxane useful as part of the present invention is characterised by extremely low solubility in toluene and n-hexane. In an embodiment, the solubility in n-hexane at 25° C. of the solid polymethylaluminoxane is 0-2 mol %. Suitably, the solubility in n-hexane at 25° C. of the solid polymethylaluminoxane is 0-1 mol %. More suitably, the solubility in n-hexane at 25° C. of the solid polymethylaluminoxane is 0-0.2 mol %. Alternatively or additionally, the solubility in toluene at 25° C. of the solid polymethylaluminoxane is 0-2 mol %. Suitably, the solubility in toluene at 25° C. of the solid polymethylaluminoxane is 0-1 mol %. More suitably, the solubility in toluene at 25° C. of the solid polymethylaluminoxane is 0-0.5 mol %. The solubility in solvents can be measured by the method described in JP—B(KOKOKU)-H07 42301.

In a particularly suitable embodiment, the solid polymethylaluminoxane is as described in WO2010/055652 or WO2013/146337, and is obtainable from Tosoh Finechem Corporation, Japan.

Polymerisation of Olefins

According to a third aspect of the present invention there is provided a process for the preparation of a polyolefin, the process comprising contacting at least one olefin with a compound of Formula I as defined herein.

The compounds of Formula I serve as highly effective procatalysts in the polymerisation of olefins, in particular ethylene. In particular, the compounds of the invention deliver the dual benefit of increased olefin polymerisation activity and industrially attractive polyolefin characteristics, including high molecular weight and low polydispersity The process may be conducted in the presence of an activator or co-catalyst. Suitably, the activator or co-catalyst is one or more organoaluminium compounds. More suitably, the one or more organoaluminium compounds is an alkylaluminium compound. Exemplary alkylaluminium compounds include methylaluminoxane, triisobutylaluminium, trimethylaluminium and triethylaluminium. Most suitably, the organoaluminium compound is triisobutylaluminium. Suitably, the mole ratio of Al in the organoaluminium compound to metal X in the compound of formula I (i.e. $[Al_{co-cat}]/[X]$) may be 75:1 to 5000:1. Suitably, $[Al_{co-cat}]/[X]$ is 400:1 to 1000:1. More suitably, $Al_{co-cat}]/[X]$ is 400:1 to 600:1.

The compounds of Formula (I) are particularly useful in the homopolymerisation of ethylene. Thus, the at least one olefin may be ethylene, such that the resulting polyolefin is a polyethylene homopolymer. The resulting polyethylene is suitably high molecular weight polyethylene (e.g. ultra-high molecular weight polyethylene), particularly high molecular weight polyethylene having a low polydispersity.

The compounds of Formula (I) are also useful in the copolymerisation of ethylene and another α-olefin. Thus, the at least one olefin may be a mixture of ethylene and another α-olefin having 3 to 10 carbon atoms, such that the polyolefin is a copolymer. Suitably, the at least one olefin may be a mixture of ethylene and another α-olefin having 3 to 8 carbon atoms, such that the polyolefin is a copolymer. The other α-olefin is suitably selected from 1-hexene and 1-octene.

The quantity of ethylene and the other α-olefin used in the copolymerisation process may be such that greater than 60% of the repeating units within the resulting copolymer are derived from the polymerisation of ethylene. Alternatively, the quantity of ethylene and the other α-olefin used in the copolymerisation process are such that greater than 70% of the repeating units within the resulting copolymer are derived from the polymerisation of ethylene. Alternatively, the quantity of ethylene and the other α-olefin used in the copolymerisation process are such that greater than 80% of the repeating units within the resulting copolymer are derived from the polymerisation of ethylene. Alternatively still, the quantity of ethylene and the other α-olefin used in the copolymerisation process are such that greater than 90% of the repeating units within the resulting copolymer are derived from the polymerisation of ethylene.

The compound of Formula (I) may be unsupported, in which case the process is conducted in solution phase. In such embodiments, the process may be conducted in the presence of a non-coordinating anion, for example tetrakis [3,5-bis(trifluoromethyl)phenyl]borate (i.e., BARF). Activation of the compound of Formula (I) with such anions may give rise to dramatically improved olefin polymerisation activity.

Alternatively, the compound of Formula I may be supported on a supporting substrate, in which case the process is conducted in slurry phase. Any suitable solvent may be used in either process. Suitably, the solvent is a nonpolar, nonaromatic hydrocarbon solvent. More suitably, the solvent is hexane.

The person of ordinary skill in the art will be able to select appropriate conditions (e.g. temperature, pressure etc) for conducting the polymerisation process. Suitably, the process may be conducted at a temperature of 25 to 90° C. More suitably, the process is conducted at a temperature of 30 to 75° C. Even more suitably, the process is conducted at a temperature of 35 to 70° C.

The following numbered statements 1-51 are not claims, but instead serve to define particular aspects and embodiments of the claimed invention:

1. A compound having a structure according to Formula I shown below:

(I)

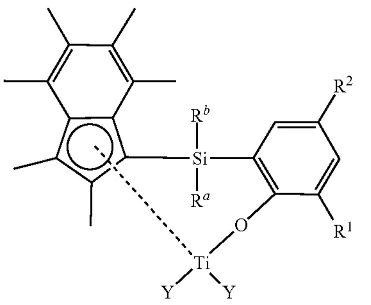

wherein $R^1$ and $R^2$ are each independently selected from the group consisting of hydrogen, (1-6C)alkyl, (1-6C)haloalkyl, (1-6C)alkoxy, (2-6C)alkenyl, (2-6C)alkynyl, —$NR^3R^4$ and —$(O)_n$—$(CR^5R^6)_m$—$R^7$, where n is 0 or 1, m is 0 or 1, $R^3$ and $R^4$ are independently selected from hydrogen and (1-3C)alkyl, $R^5$ and $R^6$ are each independently hydrogen or (1-2C)alkyl, and $R^7$ is selected from the group consisting of aryl, heteroaryl, carbocyclyl and heterocyclyl, and where each $R^7$ is independently optionally substituted with one or more groups $R^8$ selected from the group consisting of halo, hydroxy, (1-4C)alkyl, (1-4C)haloalkyl and (1-3C)alkoxy;

$R^a$ and $R^b$ are each independently selected from (1-4C)alkyl, (2-4C)alkenyl and aryl; and each Y is independently selected from the group consisting of hydride, halo, (1-5C)alkyl, (1-5C)alkoxy, —$(CH_2)_pSi(R^9)_3$, —$NR^{10}R^{11}$, and —$(O)_q$—$(CR^{12}R^{13})_r$—$R^{14}$, where p is 1 or 2, q is 0 or 1, r is 0 or 1, each $R^9$ is independently (1-3C)alkyl, $R^{10}$ and $R^{11}$ are independently selected from hydrogen and (1-3C)alkyl, $R^{12}$ and $R^{13}$ are independently selected from hydrogen and (1-2C)alkyl, and $R^{14}$ is selected from the group consisting of aryl, heteroaryl, carbocyclyl and heterocyclyl, and where each $R^{14}$ is independently optionally substituted with one or more groups $R^{15}$ selected from the group consisting of halo, hydroxy, (1-4C)alkyl, (1-4C)haloalkyl and (1-3C)alkoxy.

2. The compound of statement 1, wherein $R^1$ and $R^2$ are each independently selected from the group consisting of hydrogen, (1-5C)alkyl, (1-5C)alkoxy and —$(O)_n$—$(CR^5R^6)_m$—$R^7$.

3. The compound of statement 1 or 2, wherein $R^1$ and $R^2$ are each independently selected from the group consisting of hydrogen, (1-4C)alkyl and —$(O)_n$—$(CR^5R^6)_m$-$R^7$.

4. The compound of statement 1, 2 or 3, wherein $R^7$ is selected from the group consisting of aryl and heteroaryl.

5. The compound of any one of the preceding statements, wherein $R^7$ is selected from the group consisting of phenyl and 5-6 membered heteroaryl, wherein said 5-6 membered heteroaryl contains 1 or 2 nitrogen heteroatoms.

6. The compound of any one of the preceding statements, wherein $R^7$ is phenyl.

7. The compound of any one of the preceding statements, wherein $R^8$ is selected from the group consisting of halo and (1-3C)alkyl.

8. The compound of statement 1, wherein $R^1$ and $R^2$ are each independently selected from the group consisting of hydrogen, methyl, tert-butyl and —$C(CH_3)_2Ph$, where Ph denotes phenyl.

9. The compound of statement 1, wherein $R^1$ and $R^2$ are tert-butyl.

10. The compound of any one of the preceding statements, wherein $R^a$ and $R^b$ are each independently selected from (1-4C)alkyl and (2-4C)alkenyl.

11. The compound of any one of statements 1 to 9, wherein $R^a$ and $R^b$ are each independently selected from (1-3C) alkyl and aryl (e.g. phenyl).

12. The compound of any one of the preceding statements, wherein one of $R^a$ and $R^b$ is methyl.

13. The compound of any one of the preceding statements, wherein $R^a$ and $R^b$ are identical.

14. The compound of any one of the preceding statements, wherein $R^a$ and $R^b$ are methyl.

15. The compound of any one of the preceding statements, wherein each Y is independently selected from the group consisting of hydride, chloro, bromo, iodo, (1-3C)alkyl, (1-3C)alkoxy, —$(CH_2)_pSi(R^9)_3$, —$NR^{10}R^{11}$, and —$(O)_q$—$(CR^{12}R^{13})_r$—$R^1$.

16. The compound of any one of the preceding statements, wherein p is 1 and $R^9$ is methyl.

17. The compound of any one of the preceding statements, wherein $R^{10}$ and $R^{11}$ are independently selected from (1-3C)alkyl.

18. The compound of any one of the preceding statements, wherein $R^{12}$ and $R^{13}$ are hydrogen.

19. The compound of any one of the preceding statements, wherein $R^{14}$ is selected from the group consisting of aryl and heteroaryl.

20. The compound of any one of the preceding statements, wherein $R^{14}$ is selected from the group consisting of phenyl and 5-6 membered heteroaryl, wherein said 5-6 membered heteroaryl contains 1 or 2 nitrogen heteroatoms.

21. The compound of any one of the preceding statements, wherein $R^{14}$ is phenyl.

22. The compound of any one of the preceding statements, wherein $R^{15}$ is selected from the group consisting of (1-4C)alkyl, (1-4C)haloalkyl and (1-3C)alkoxy.

23. The compound of any one of the preceding statements, wherein $R^{15}$ is selected from the group consisting of (1-4C)alkyl.

24. The compound of any one of the preceding statements, wherein each Y is independently selected from the group consisting of chloro, bromo, iodo, methyl, —$CH_2Si(CH_3)_3$, —$N(CH_3)_2$ and —O-2,6-diisopropylphenyl.

25. The compound of any one of the preceding statements, wherein each Y is independently selected from the group consisting of chloro, bromo, iodo and methyl.
26. The compound of any one of the preceding statements, wherein both Y are identical.
27. The compound of any one of the preceding statements, wherein Y is chloro.
28. The compound of any one of the preceding statements, wherein the compound has a structure according to Formula I-A shown below:

I-A

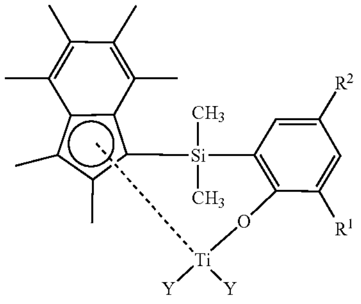

wherein $R^1$, $R^2$ and Y are as defined in any one of the preceding statements.

29. The compound of any one of the preceding statements, wherein the compound has a structure according to Formula I-B shown below:

I-B

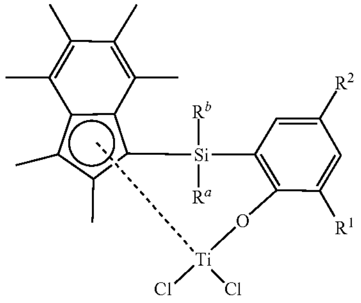

wherein $R^1$, $R^2$, $R^a$ and $R^b$ are as defined in any one of statements 1 to 27.

30. The compound of any one of the preceding statements, wherein the compound has a structure according to Formula I-C shown below:

I-C

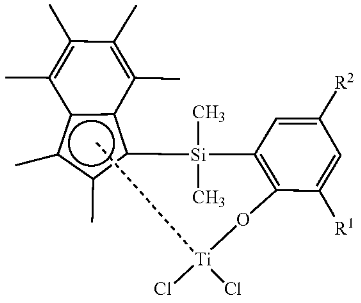

wherein $R^1$ and $R^2$ are as defined in any one of statements 1 to 27.

31. The compound of any one of the preceding statements, wherein the compound has a structure according to any one of the following:

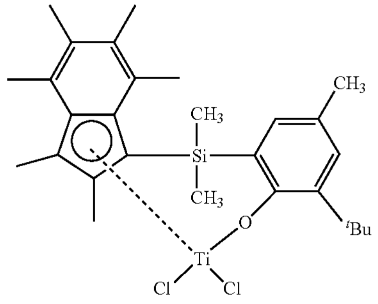

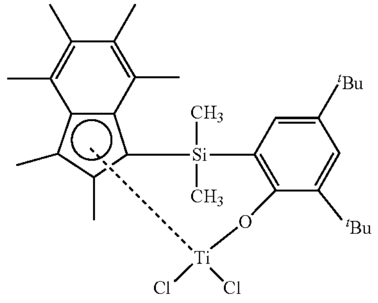

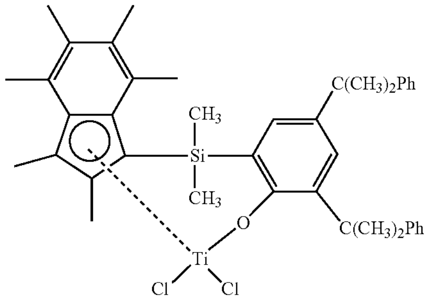

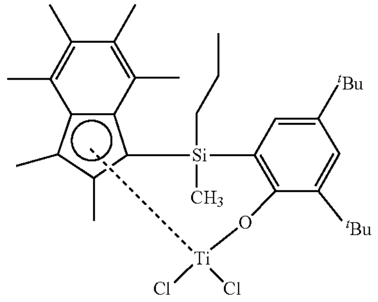

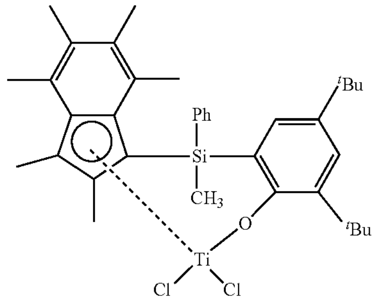

-continued

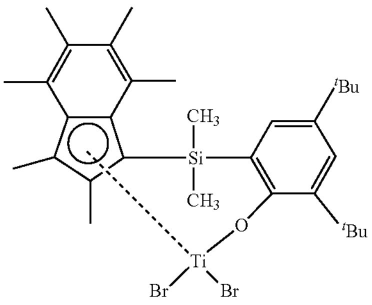

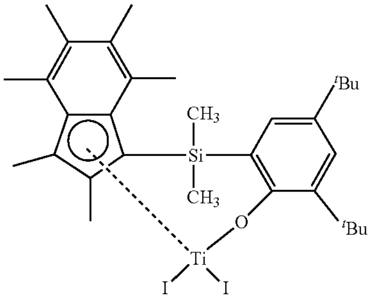

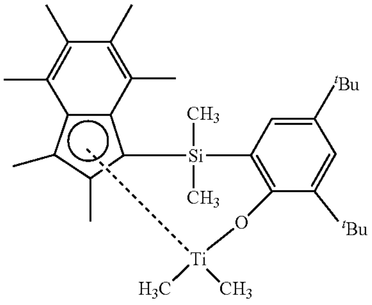

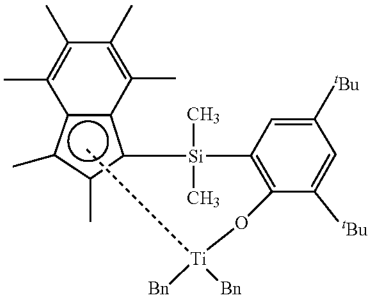

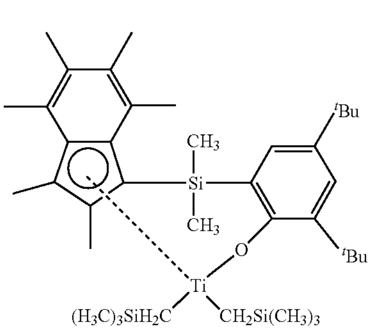

-continued

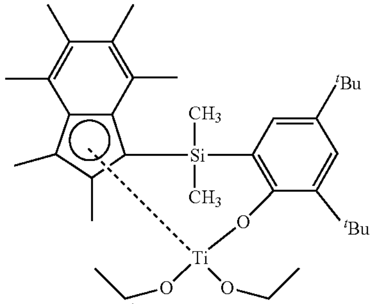

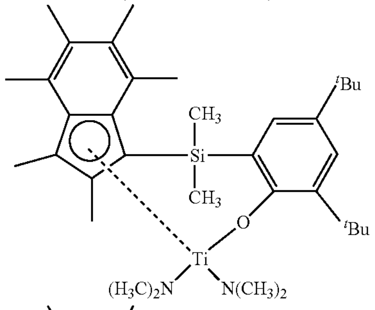

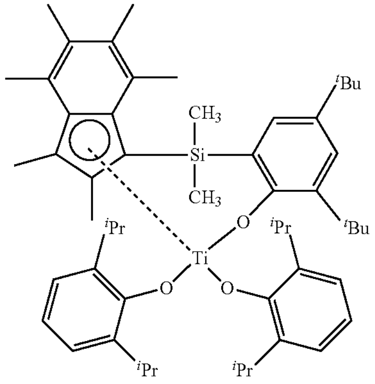

wherein $^{t}$Bu denotes tert-butyl, $^{i}$Pr denotes iso-propyl, Ph denotes phenyl and Bn denotes benzyl.

32. The compound of any one of the preceding statements, wherein the compound is supported on a supporting substrate.

33. The compound of statement 32, wherein the supporting substrate is selected from the group consisting of silica, layered double hydroxide, silica-supported methylaluminoxane, layered double hydroxide-supported methylaluminoxane and solid polymethylaluminoxane.

34. The compound of statement 33, wherein the supporting substrate is layered double hydroxide-supported methylaluminoxane.

35. The compound of statement 33, wherein the supporting substrate is solid polymethylaluminoxane.

36. A process for the preparation of a polyolefin, the process comprising contacting at least one olefin with a compound of Formula I as defined in any one of statements 1 to 35.

37. The process of statement 36, wherein the at least one olefin is ethylene such that the polyolefin is a polyethylene homopolymer.

38. The process of statement 36, wherein the at least one olefin is a mixture of ethylene and another α-olefin having 3 to 10 carbon atoms, such that the polyolefin is a copolymer.

39. The process of statement 38, wherein the other α-olefin are selected from 1-hexene and 1-octene.

40. The process of statement 38 or 39, wherein greater than 60% of the repeating units within the copolymer are derived from the polymerisation of ethylene.
41. The process of statement 38 or 39, wherein greater than 70% of the repeating units within the copolymer are derived from the polymerisation of ethylene.
42. The process of any one of statements 36 to 41, wherein the compound of Formula I is unsupported and the process is conducted in solution phase.
43. The process of statement 42, wherein the process is conducted in the presence of a non-coordinating anion (e.g., tetrakis[3,5-bis(trifluoromethyl)phenyl]borate).
44. The process of any one of statements 36 to 41, wherein the compound of Formula I is supported on a supporting substrate and the process is conducted in slurry phase.
45. The process of any one of statements 36 to 44, wherein the process is conducted in the presence of an alkyl aluminium compound.
46. The process of statement 45, wherein the alkyl aluminium compound is selected from the group consisting of triisobutylaluminium, methylaluminoxane, triethylaluminium and trimethylaluminium.
47. The process of statement 46, wherein the alkyl aluminium compound is triisobutylaluminium.
48. The process of any one of statements 36 to 47, wherein the process is conducted at a temperature of 25 to 90° C.
49. The process of any one of statements 36 to 47, wherein the process is conducted at a temperature of 30 to 75° C.
50. The process of any one of statements 36 to 47, wherein the process is conducted at a temperature of 35 to 70° C.
51. The process of any one of statements 36 to 50, wherein the process is conducted in a nonpolar, nonaromatic hydrocarbon solvent.
52. The process of statement 51, wherein the solvent is hexane.

Examples

One or more examples of the invention will now be described, for the purpose of illustration only, with reference to the accompanying figures, in which:

FIG. 1A shows slurry-phase ethylene polymerisation activity as a function of temperature of sMAO-supported $^{Me2}$SB($^{tBu,Me}$ArO,I*)$TiCl_2$ (square), $^{Me2}$SB($^{tBu2}$ArO,I*)$TiCl_2$ (triangle), $^{Me2}$SB($^{tBu2}$ArO,I*)Ti$(CH_2SiMe_3)_2$(open triangle), $^{Me2}$SB($^{cumyl2}$ArO,I*)$TiCl_2$ (circle), and $^{Me2}$SB($^{tBu,Me}$ArO,Ind)$TiCl_2$ (diamond). Polymerisation conditions: $[Al_{sMAO}]_0/[Ti]_0$=200, TIBA (150 mg), ethylene (2 bar), pre-catalyst (10 mg), hexanes (50 mL), and 30 minutes. Error bars shown at one standard deviation.

FIG. 1B shows slurry-phase ethylene polymerisation activity as a function of temperature of sMAO-supported $^{Me2}$SB($^{tBu,Me}$ArO,I*)$TiCl_2$ (square), $^{Me2}$SB($^{tBu2}$ArO,I*)$TiCl_2$ (up triangle), $^{Me2}$SB($^{tBu2}$ArO,I*)$ZrCl_2$ (down triangle), $^{Me2}$SB($^{cumyl2}$ArO,I*)$TiCl_2$ (circle), and $^{Me2}$SB($^{tBu,Me}$ArO,Ind)$TiCl_2$ (diamond), rac-$^{Me,nPr}$SB($^{tBu2}$ArO,I*)$TiCl_2$ (star), rac-$^{Me,Ph}$SB($^{tBu2}$ArO,I*)$TiCl_2$ (open star). Polymerisation conditions: $[Al_{sMAO}]_0/[Ti]_0$=200, TIBA (150 mg), ethylene (2 bar), pre-catalyst (10 mg), hexanes (50 mL), and 30 minutes. Error bars shown at one standard deviation.

FIG. 2A shows slurry-phase ethylene polymerisation activity of sMAO-supported $^{Me2}$SB($^{tBu2}$ArO,I*)$TiR_2$, R=Cl (filled triangle), Br (half-filled triangle), I (open triangle), $CH_2SiMe_3$ (filled square), Me (open square), $O^{2,6\text{-}iPr}$Ar (filled circle), and $NMe_2$ (open circle). Polymerisation conditions: $[Al_{sMAO}]_0/[Ti]_0$=200, TIBA (150 mg), ethylene (2 bar), pre-catalyst (10 mg), hexanes (50 mL), and 30 minutes. Error bars shown at one standard deviation.

FIG. 2B shows slurry-phase ethylene polymerisation activity of sMAO-supported $^{Me2}$SB($^{tBu2}$ArO,I*)$TiR_2$, R=Cl (up triangle), Br (right triangle), I (left triangle), Me (down triangle), Bn ($CH_2Ph$, open up triangle), $CH_2SiMe_3$ (open left triangle), OEt (open right triangle), $O^{2,6\text{-}iPr}$Ar (open down triangle), and $NMe_2$ (half-filled triangle). Polymerisation conditions: $[Al_{sMAO}]_0/[Ti]_0$=200, TIBA (150 mg), ethylene (2 bar), pre-catalyst (10 mg), hexanes (50 mL), and 30 minutes. Error bars shown at one standard deviation.

FIG. 3A shows weight-average molecular weight ($M_w$) of polyethylene as a function of temperature of sMAO-supported $^{Me2}$SB($^{tBu,Me}$ArO,I*)$TiCl_2$ (square), $^{Me2}$SB($^{tBu2}$ArO,I*)$TiCl_2$ (triangle), $^{Me2}$SB($^{Cumyl2}$ArO,I*)$TiCl_2$ (circle), and $^{Me2}$SB($^{tBu,Me}$ArO,Ind)$TiCl_2$ (diamond). PDIs ($M_w/M_n$) annotated. Polymerisation conditions: $[Al_{sMAO}]_0/[Ti]_0$=200, TIBA (150 mg), ethylene (2 bar), pre-catalyst (10 mg), hexanes (50 mL), and 30 minutes.

FIG. 3B shows weight-average molecular weight ($M_w$) of polyethylene as a function of temperature of sMAO-supported $^{Me2}$SB($^{tBu,Me}$ArO,I*)$TiCl_2$ (square), $^{Me2}$SB($^{tBu2}$ArO,I*)$TiR_2$, {R=Cl (up triangle), Br (right triangle), I (left triangle), Me (down triangle), $CH_2SiMe_3$ (open left triangle), OEt (open right triangle), $O^{2,6\text{-}iPr}$Ar (open down triangle), and $NMe_2$ (half-filled triangle)}, $^{Me2}$SB($^{cumyl2}$ArO,I*)$TiCl_2$ (circle), and $^{Me2}$SB($^{tBu,Me}$ArO,Ind)$TiCl_2$ (diamond), rac-$^{Me,nPr}$SB($^{tBu2}$ArO,I*)$TiCl_2$ (star), rac-$^{Me,Ph}$SB($^{tBu2}$ArO,I*)$TiCl_2$ (open star). PDIs ($M_w/M_n$) annotated. Polymerisation conditions: $[Al_{sMAO}]_0/[Ti]_0$=200, TIBA (150 mg), ethylene (2 bar), pre-catalyst (10 mg), hexanes (50 mL), and 30 minutes.

FIG. 4 shows slurry-phase ethylene polymerisation activity as a function of temperature of $^{Me2}$SB($^{tBu2}$ArO,I*)$TiCl_2$ supported on sMAO (triangle), SSMAO (circle), LDHMAO ($Mg_3Al—CO_3$-1H/MAO, square). Polymerisation conditions: $[Al_{MAO\text{-}support}]_0/[Ti]_0$=200, TIBA (150 mg), ethylene (2 bar), pre-catalyst (10 mg), hexanes (50 mL), and 30 minutes. Error bars shown at one standard deviation.

FIG. 5A shows slurry-phase and solution-phase polymerisation activity as a function of temperature of $^{Me2}$SB($^{tBu2}$ArO,I*)$TiCl_2$ in solution-phase (diamond) and supported on sMAO (triangle), SSMAO (circle), LDHMAO (square). Slurry-phase polymerisation conditions: $[Al_{MAO\text{-}support}]_0/[Ti]_0$=200, TIBA (150 mg), ethylene (2 bar), pre-catalyst (10 mg), hexanes (50 mL), and 30 minutes. Error bars shown at one standard deviation. Solution-phase polymerisation conditions: $[Al_{MAO}]_0/[Ti]_0$=1000, ethylene (2 bar), 414.4 μg complex, 1 mL toluene, 49 mL hexanes, and 5 minutes (due to reactor fouling occurring after longer reaction times).

FIG. 5B shows weight-average molecular weight ($M_w$) of polyethylene as a function of polymerisation temperature for $^{Me2}$SB($^{tBu2}$ArO,I*)$TiCl_2$ supported on sMAO (triangle), SSMAO (circle), LDHMAO ($Mg_3Al—CO_3$-1H/MAO, square), and in solution-phase (diamond). PDIs ($M_w/M_n$) annotated. Polymerisation conditions: $[Al_{MAO}]_0/[Ti]_0$=200, TIBA (150 mg), ethylene (2 bar), pre-catalyst (10 mg), hexanes (50 mL), and 30 minutes. Solution-phase polymerisation conditions: 414.1 μg complex, MAO (41.5 mg, $[Al_{MAO}]_0/[Ti]_0$=1000), ethylene (2 bar), hexanes (49 mL), toluene (1 mL), and 5 minutes.

FIG. 5C shows scanning electron micrographs of polyethylene, synthesised using $^{Me2}$SB($^{tBu2}$ArO,I*)$TiCl_2$ supported on (i) sMAO, (ii) SSMAO, (iii) LDHMAO, and (iv) solution-phase. Slurry-phase polymerisation conditions: $[Al_{support}]_0/[Ti]_0$=200, 150 mg TIBA, 2 bar ethylene, 10 mg catalyst, 50 mL hexanes, 60° C., and 30 minutes. Solution-phase polymerisation conditions: $[Al_{MAO}]_0/[Ti]_0=1000$, 2 bar ethylene, 414 μg catalyst, 49 mL hexanes, 1 mL toluene, 60° C., and 5 minutes.

FIG. 6 shows ethylene polymerisation activity as a function of temperature of $^{Me2}SB(^{tBu2}ArO,I^*)TiCl_2$/MAO, $^{Me2}SB(^{tBu2}ArO,I^*)TiMe_2$/TB, and sMAO-$^{Me2}SB(^{tBu2}ArO,I^*)TiCl_2$. Polymerisation conditions: $[Al_{MAO}]_0/[Ti]_0=200$, TIBA (150 mg) or MAO ($[Al_{MAO}]_0/[Ti]_0=1000$) or TB ($[TB]_0/[Ti]_0=1$), ethylene (2 bar), pre-catalyst (714 $nmol_{Ti}$), hexanes (50 mL), 5-30 minutes (or until stirring ceased), and 60° C. Error bars shown at one standard deviation.

FIG. 7 shows slurry-phase ethylene polymerisation activity of sMAO-$^{Me2}SB(^{tBu2}ArO,I^*)TiCl_2$ with varying aluminium co-catalysts. Polymerisation conditions: $[Al_{MAO}]_0/[Ti]_0=200$, ethylene (2 bar), pre-catalyst (10 mg), hexanes (50 mL), 30 minutes, 60° C., and either methylaluminoxane (MAO, 41.5 mg), triethylaluminium (TEA, 81.6 mg), trimethylaluminium (TMA, 51.5 mg) or triisobutylaluminium (TIBA, 150 mg). Error bars shown at one standard deviation.

FIG. 8 shows weight-average molecular weight ($M_w$) of polyethylene with varying aluminium co-catalysts. Polymerisation conditions: $[Al_{sMAO}]_0/[Ti]_0=200$, ethylene (2 bar), pre-catalyst (10 mg), hexanes (50 mL), 30 minutes, 60° C., and either methylaluminoxane (MAO, 41.5 mg), triethylaluminium (TEA, 81.6 mg), trimethylaluminium (TMA, 51.5 mg) or triisobutylaluminium (TIBA, 150 mg).

FIG. 9 shows slurry-phase ethylene polymerisation activity of sMAO-$^{Me2}SB(^{tBu2}ArO,I^*)TiCl_2$ as a function of $[Al_{TIBA}]_0/[Ti]_0$. Polymerisation conditions: $[Al_{sMAO}]_0/[Ti]_0=200$, ethylene (2 bar), pre-catalyst (10 mg), hexanes (50 mL), 30 minutes, and 60° C. Error bars shown at one standard deviation.

FIG. 10 shows weight-average molecular weight ($M_w$) of polyethylene as a function of $[Al_{TIBA}]_0/[Ti]_0$. Polymerisation conditions: $[Al_{sMAO}]_0/[Ti]_0=200$, ethylene (2 bar), pre-catalyst (10 mg), hexanes (50 mL), 30 minutes, and 60° C.

FIG. 11 shows slurry-phase ethylene polymerisation activity of sMAO-$^{Me2}SB(^{tBu2}ArO,I^*)TiCl_2$ as a function of reaction time either at a scale of 50 mL (filled square) or 250 mL (open square). Polymerisation conditions: $[Al_{sMAO}]_0/[Ti]_0=200$, ethylene (2 bar), TIBA (150 mg or 750 mg), pre-catalyst (10 mg), hexanes (50 mL or 250 mL), 30 minutes, and 60° C. Error bars shown at one standard deviation.

FIG. 12 shows weight-average molecular weight ($M_w$) of polyethylene as a function of reaction time either at a scale of 50 mL (filled square) or 250 mL (open square). Polymerisation conditions: $[Al_{sMAO}]_0/[Ti]_0=200$, ethylene (2 bar), TIBA (150 mg or 750 mg), pre-catalyst (10 mg), hexanes (50 mL or 250 mL), and 60° C.

FIG. 13 shows slurry-phase ethylene polymerisation activity of sMAO-$^{Me2}SB(^{tBu2}ArO,I^*)TiCl_2$ as a function of the amount of catalyst. Polymerisation conditions: $[Al_{sMAO}]_0/[Ti]_0=200$, ethylene (2 bar), TIBA (150 mg), pre-catalyst (× mg), hexanes (50 mL), 30 minutes, and 60° C. Error bars shown at one standard deviation.

FIG. 14 shows weight-average molecular weight ($M_w$) of polyethylene as a function of the amount of catalyst. Polymerisation conditions: $[Al_{sMAO}]_0/[Ti]_0=200$, ethylene (2 bar), TIBA (150 mg), pre-catalyst (× mg), hexanes (50 mL), 30 minutes, and 60° C.

FIG. 15A shows slurry-phase ethylene/1-hexene compolymerisation activity as a function of comonomer volume of sMAO-$^{Me2}SB(^{tBu2}ArO,I^*)TiCl_2$. Polymerisation conditions: $[Al_{sMAO}]_0/[Ti]_0=200$, TIBA (150 mg), ethylene (2 bar), pre-catalyst (10 mg), hexanes (50 mL), 1-hexene (× μL), 30 minutes, and either 50° C. (filled square), 60° C. (half-filled square), or 70° C. (open square). Error bars shown at one standard deviation.

FIG. 15B shows slurry-phase ethylene/1-hexene copolymerisation activity as a function of comonomer volume of sMAO-$^{Me2}SB(^{tBu2}ArO,I^*)TiCl_2$. Polymerisation conditions: $[Al_{sMAO}]_0/[Ti]_0=200$, TIBA (150 mg), ethylene (2 bar), pre-catalyst (10 mg), hexanes (50 mL), 1-hexene (0-5000 μL), 30 minutes, and 30-90° C. Error bars shown at one standard deviation. Asterisk (*) denotes gel formation.

FIG. 16 shows slurry-phase ethylene/1-octene compolymerisation activity as a function of comonomer volume of sMAO-$^{Me2}SB(^{tBu2}ArO,I^*)TiCl_2$. Polymerisation conditions: $[Al_{sMAO}]_0/[Ti]_0=200$, TIBA (150 mg), ethylene (2 bar), pre-catalyst (10 mg), hexanes (50 mL), 1-octene (× μL), 30 minutes, and either 50° C. (filled square), 60° C. (half-filled square), or 70° C. (open square). Error bars shown at one standard deviation.

Figure 20:
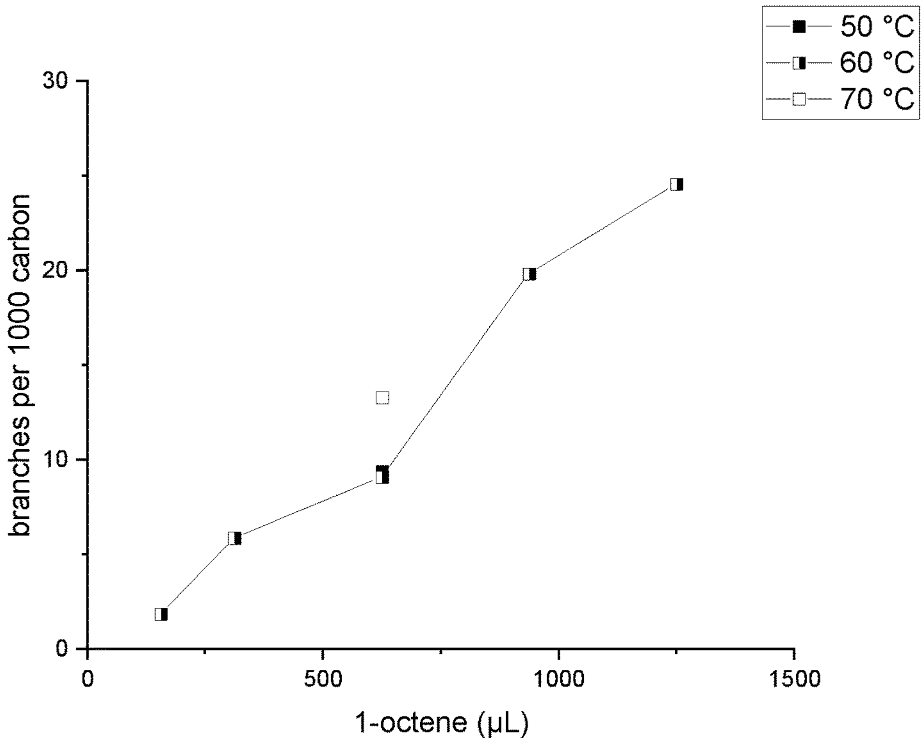

FIG. 20 shows 1-octene incorporation in polyethylene-co-octene produced by of sMAO-$^{Me2}SB(^{tBu2}ArO,I^*)TiCl_2$ (reported as the number of branches per 1000 carbons) as a function of comonomer volume. Polymerisation conditions: $[Al_{sMAO}]_0/[Ti]_0=200$, TIBA (150 mg), ethylene (2 bar), pre-catalyst (10 mg), hexanes (50 mL), 1-octene (× μL), 30 minutes, and either 50° C. (filled square), 60° C. (half-filled square), or 70° C. (open square).

Figure 21:
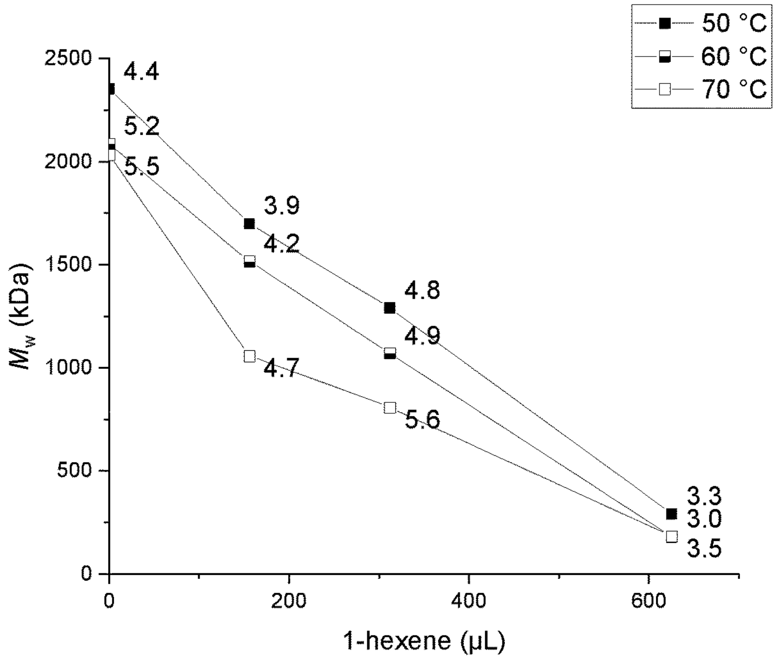

FIG. 21 shows weight-average molecular weight ($M_w$) of polyethylene-co-1-hexene as a function of amount of comonomer of sMAO-$^{Me2}SB(^{tBu2}ArO,I^*)TiCl_2$ at 50° C. (filled square), 60° C. (half-filled square), and 70° C. (open square). PDIs ($M_w/M_n$) annotated. Polymerisation conditions: $[Al_{sMAO}]_0/[Ti]_0=200$, TIBA (150 mg), ethylene (2 bar), LAO (× μL) pre-catalyst (10 mg), hexanes (50 mL), and 30 minutes.

Figure 22:
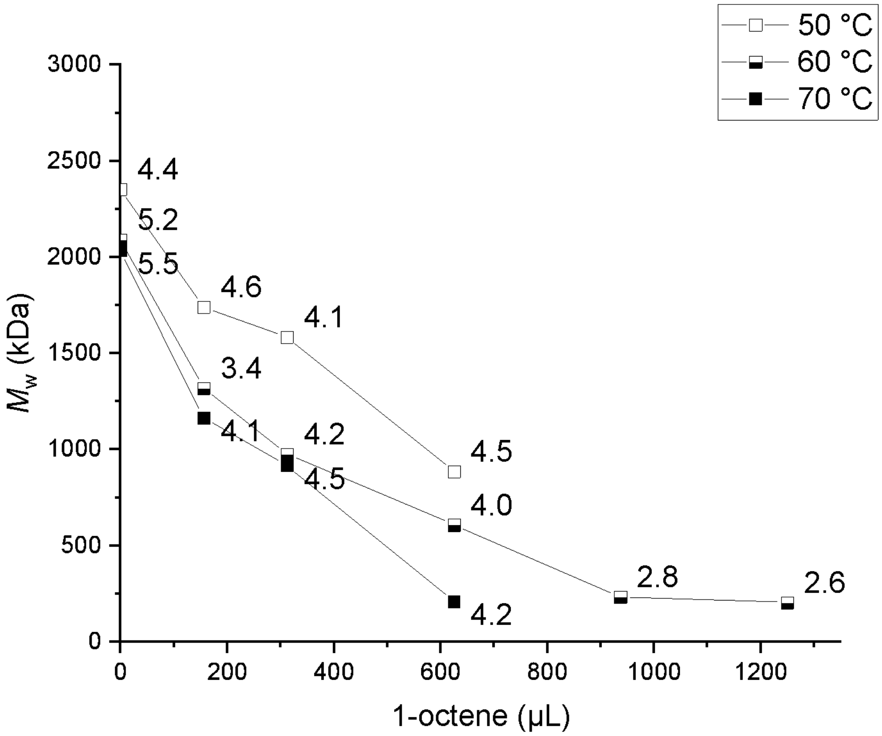

FIG. 22 shows weight-average molecular weight ($M_w$) of polyethylene-co-1-octene as a function of amount of comonomer of sMAO-$^{Me2}SB(^{tBu2}ArO,I^*)TiCl_2$ at 50° C. (open square), 60° C. (half-filled square), and 70° C. (filled square). PDIs ($M_W/M_n$) annotated. Polymerisation conditions: $[Al_{sMAO}]_0/[Ti]_0=200$, TIBA (150 mg), ethylene (2 bar), 1-octene (× mL) pre-catalyst (10 mg), hexanes (50 mL), and 30 minutes.

Figure 23A:
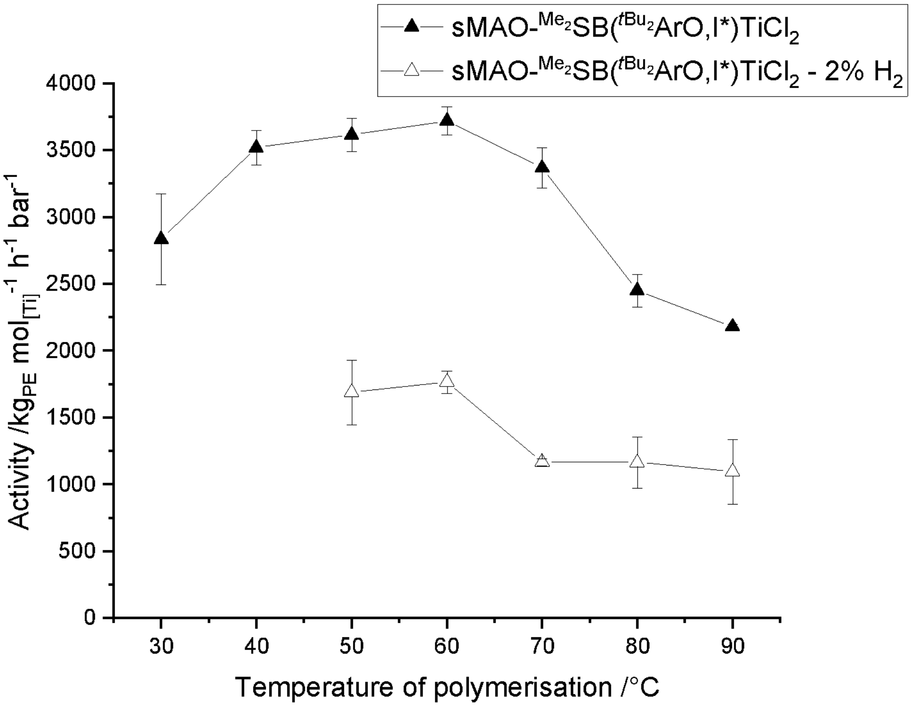
Figure 23B:
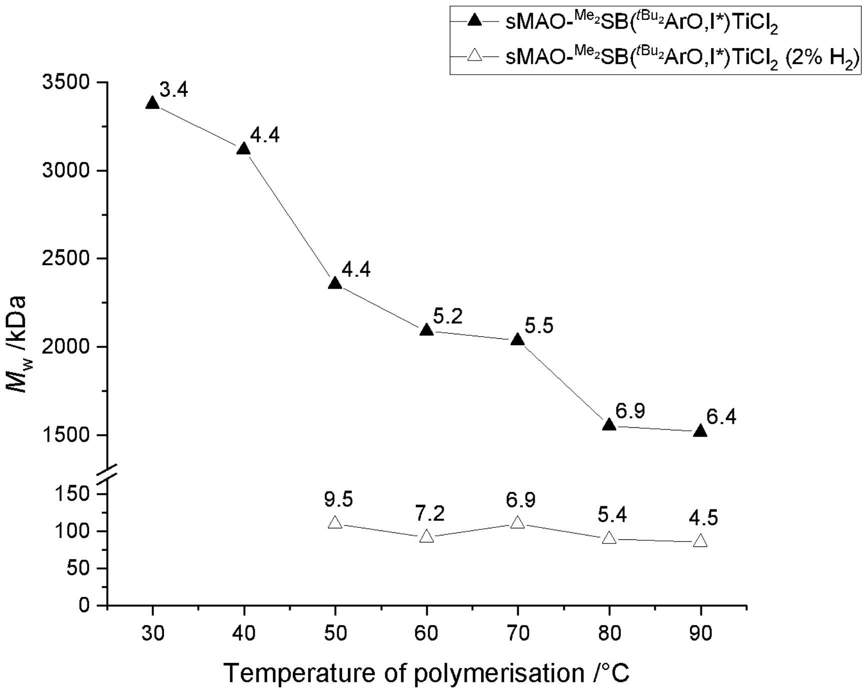

FIGS. 23A and 23B show slurry-phase ethylene polymerisation activity as a function of temperature of $^{Me2}SB(^{tBu2}ArO,I^*)TiCl_2$ supported on sMAO using 0% (triangle) and 2% (open triangle) $H_2$. Error bars shown at one standard deviation. Weight-average molecular weight ($M_w$) of polyethylene as a function of polymerisation temperature. PDIs ($M_w/M_n$) annotated.

Figure 24:
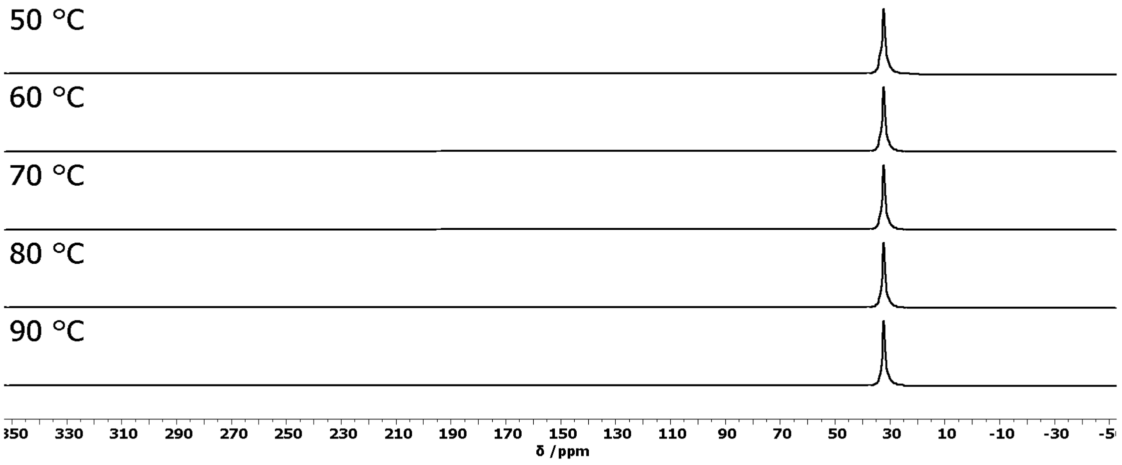

FIG. 24 shows $^{13}C$ CPMAS ssNMR spectra of UHMWPE synthesised by sMAO-$^{Me2}$SB($^{tBu2}$ArO,I*)$TiCl_2$.

Figure 25:
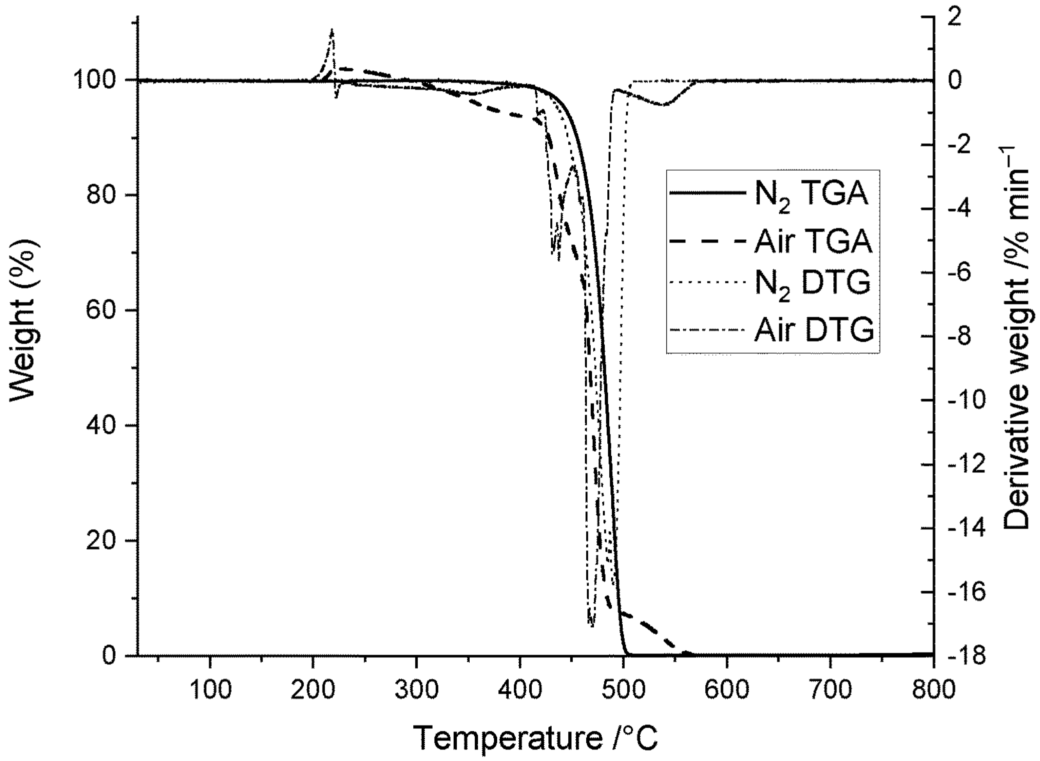

FIG. 25 shows thermogravimetric analysis of UHMWPE synthesised by sMAO-$^{Me2}$SB($^{tBu2}$ArO,I*)$TiCl_2$ at 30° C.

Figure 26:
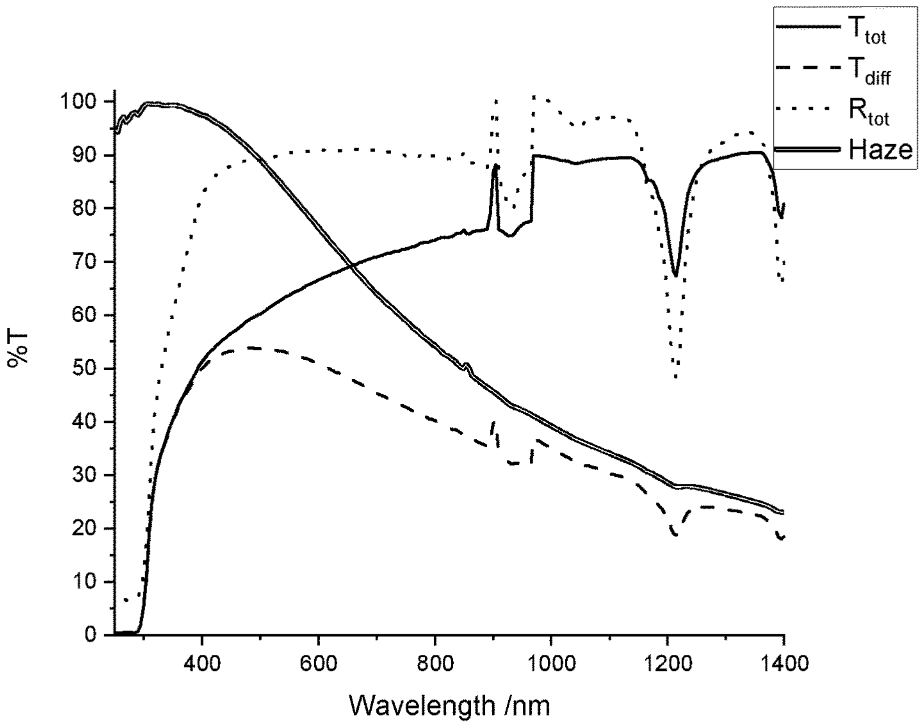

FIG. 26 shows UV-Vis-NIR spectrophotometry as a function of wavelength of UHMWPE synthesised by sMAO-$^{Me2}$SB($^{tBu2}$ArO,I*)$TiCl_2$ at 30° C.

Figure 27:
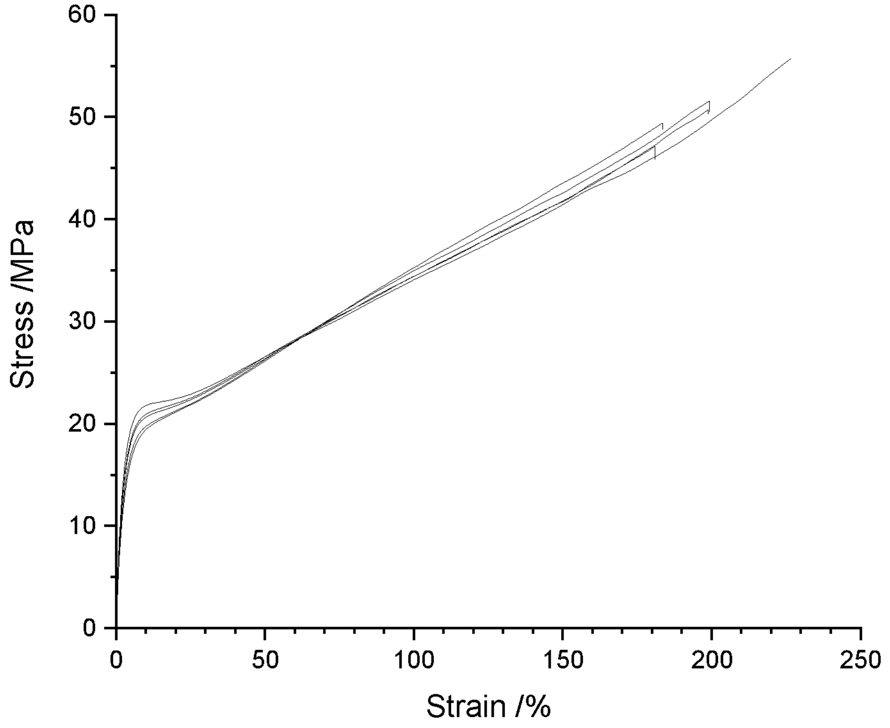

FIG. 27 shows engineering tensile stress-stain curves of UHMWPE synthesised by sMAO-$^{Me2}$SB($^{tBu2}$ArO,I*)$TiCl_2$ at 30° C., measured according to ISO 527-2/5A. Et=627 MPa, $\sigma_B$=50.2 MPa, $\varepsilon_B$=197.8%.

Figure 28A:
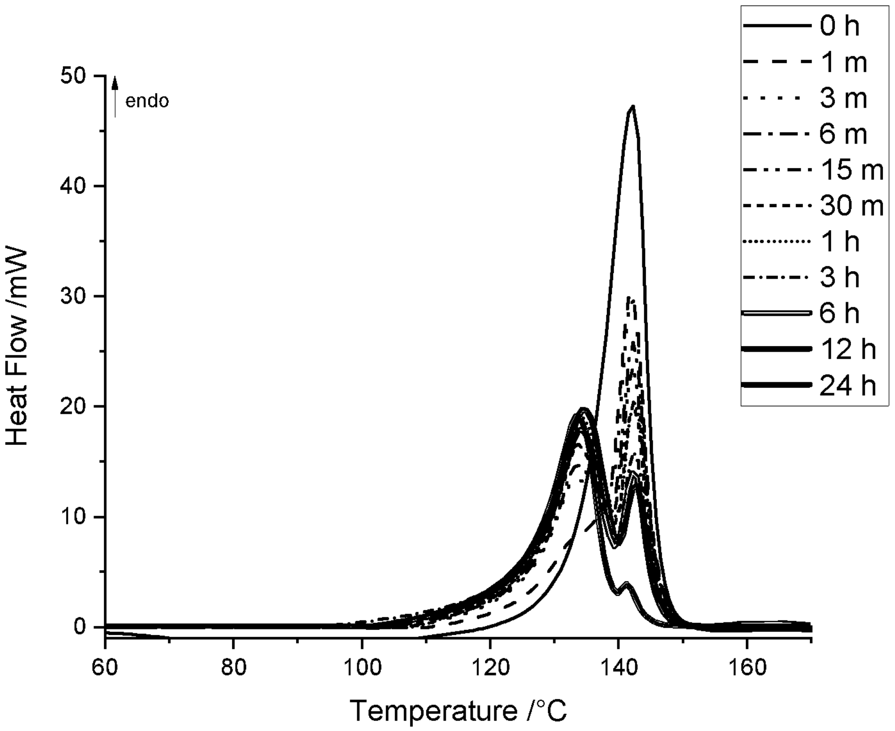
Figure 28B:
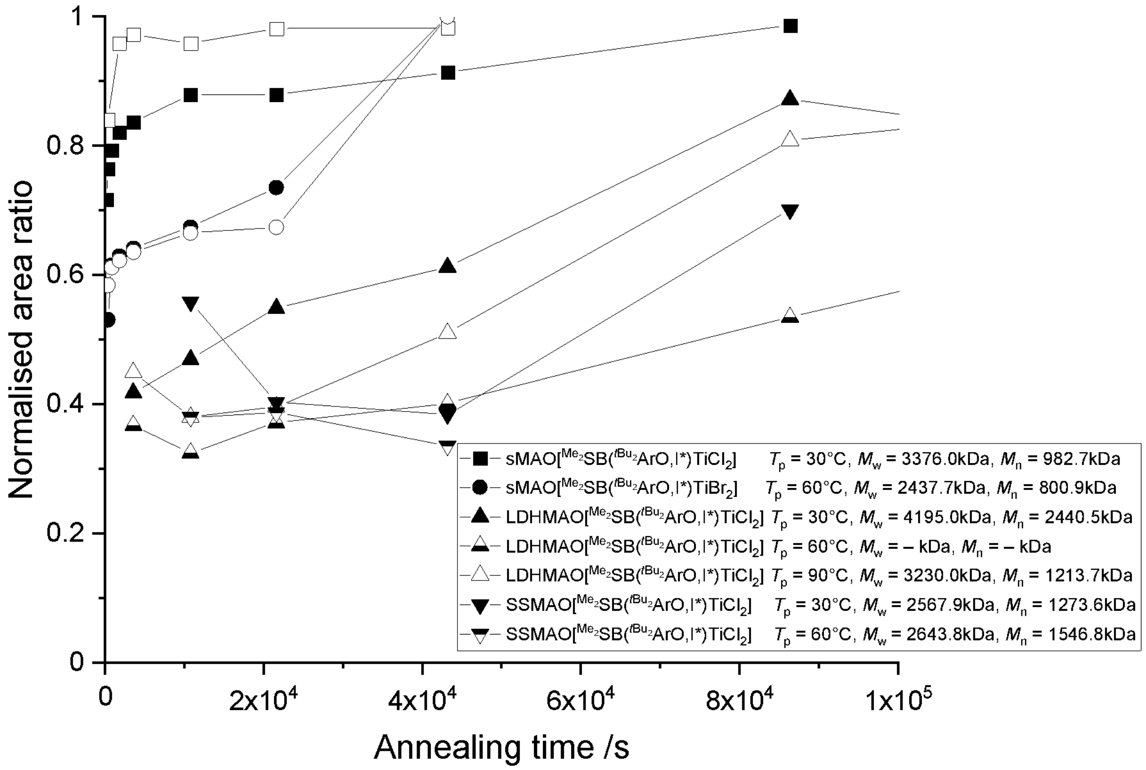

FIGS. 28A and 28B show evolution of the normalised area of DSC peaks as a function of annealing time.

Figure 29A:
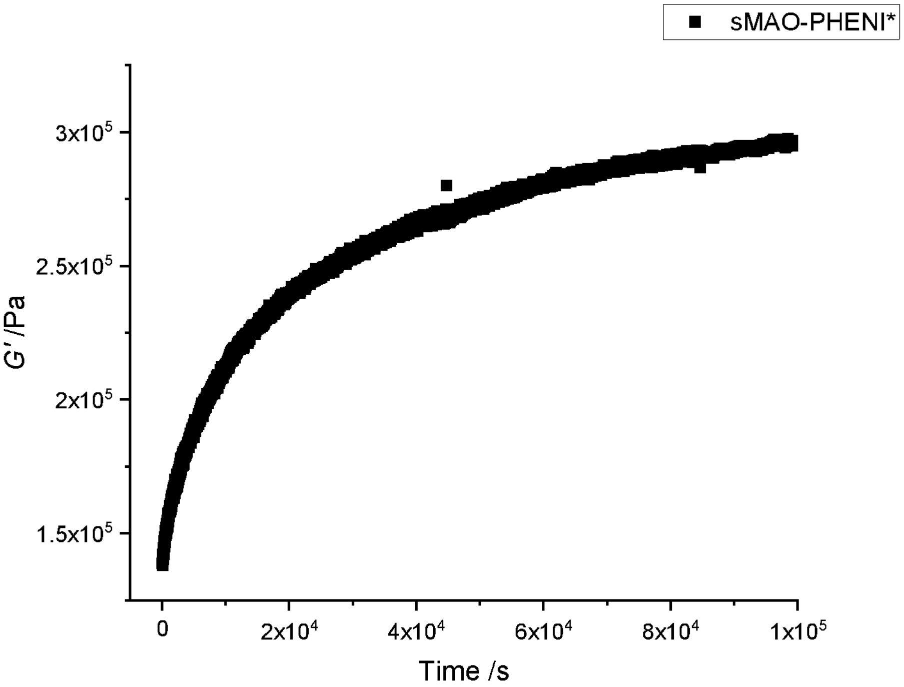
Figure 29B:
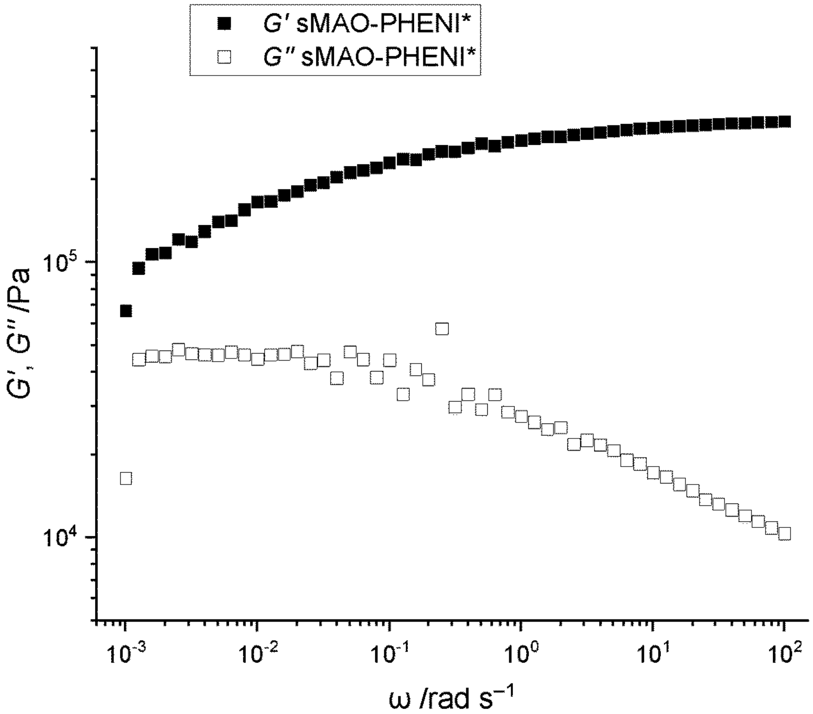

FIGS. 29A and 29B show time-sweep and frequency-sweep rheological characterisation of UHMWPE synthesised by sMAO-$^{Me2}$SB($^{tBu2}$ArO,I*)$TiCl_2$ at 30° C.

Figure 30A:
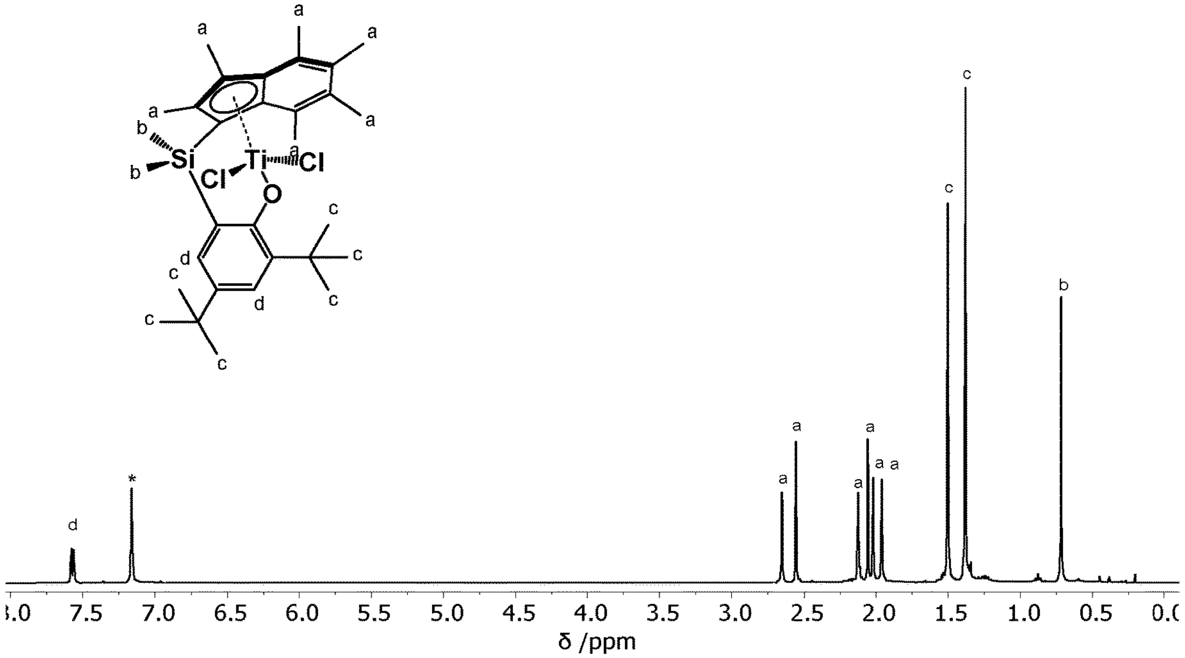

FIG. 30A shows $^{1}H$ NMR spectrum (400 MHz, benzene-$d_6$, 298 K) of $^{Me2}$SB($^{tBu}$2ArO,I*)$TiCl_2$. The asterisk (*) denotes residual protio-benzene.

Figure 30B:
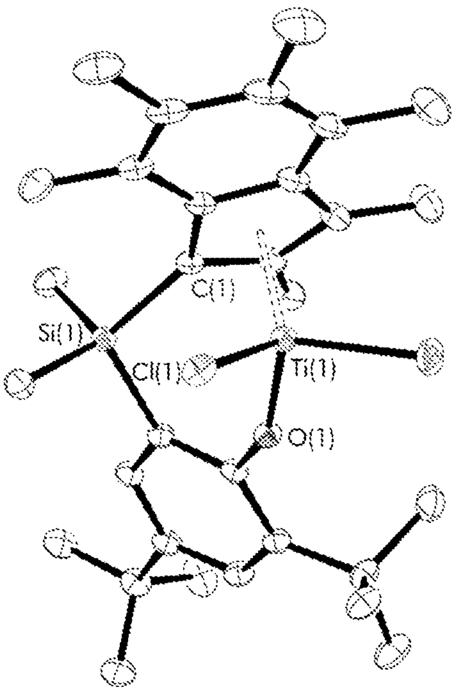

FIG. 30B shows solid-state structure and table of crystallographic parameters of $^{Me2}$SB($^{tBu}$2ArO,I*)$TiCl_2$; bond lengths in A and angles in °, thermal displacement ellipsoids drawn at 30% probability and all hydrogen atoms omitted for clarity.

Figure 31:
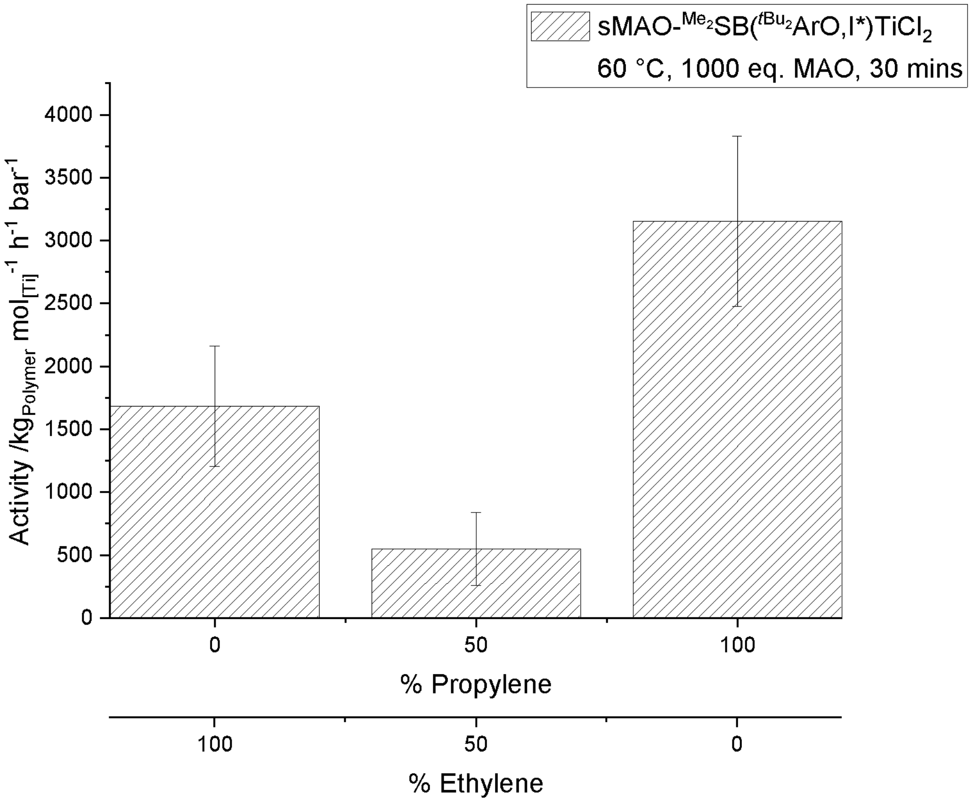

FIG. 31 shows the slurry-phase polymerisation activity of sMAO-$^{Me2}$SB($^{tBu2}$ArO,I*)$TiCl_2$ as a function of monomer composition. Polymerisation conditions: $[Al_{sMAO}]_0$/$[Ti]_0$=200, $[Al_{MAO}]$/$[Ti]_0$=1000, monomer (2 bar), pre-catalyst (10 mg), hexanes (50 mL), 30 minutes, and 60° C.

Figure 32:
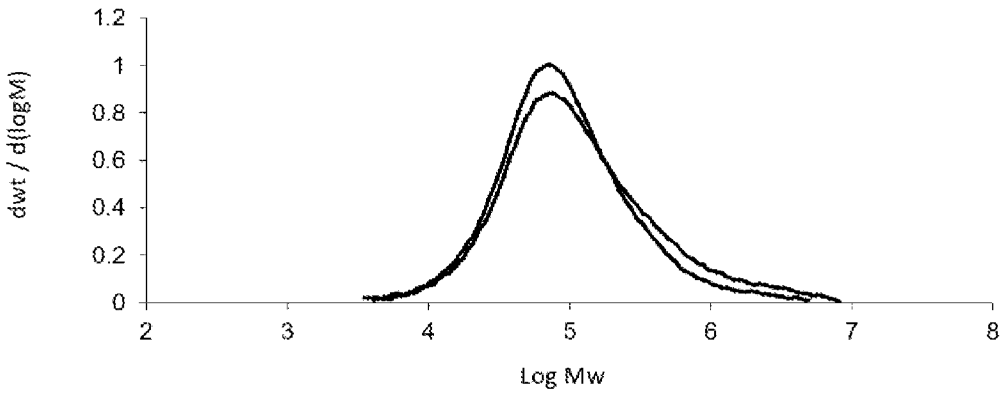

FIG. 32 shows the gel permeation chromatogram of EPM, $M_w$=296 kDa, PDI=3.2, 57 wt % propylene calculated from GPC-IR.

MATERIALS AND METHODS

Air- and moisture-sensitive compounds were manipulated under an inert atmosphere of nitrogen, using standard Schlenk line techniques[1] on a dual manifold vacuum/nitrogen line or in an MBraun Labmaster 100 glovebox.

Pentane, hexane, toluene and benzene were dried using an MBraun SPS 800 solvent purification system, stored over a potassium mirror, and degassed under partial vacuum before use. Anhydrous DCM was dried using an MBraun SPS 800 system, stored over pre-activated 3 Å molecular sieves and degassed under partial vacuum before use. Tetrahydrofuran was distilled from sodium/benzophenone, stored over pre-activated 3 Å molecular sieves and degassed under partial vacuum before use.

Deuterated solvents were dried over potassium metal (benzene-$d_6$ and toluene-$d_6$) or $CaH_2$ (chloroform-d, pyridine-$d_5$ and tetrahydrofuran-$d_6$) and reflux under reduced pressure, distilled under static vacuum, freeze-pump-thaw degassed three times and stored over pre-activated 3 or 4 Å molecular sieves. Chloroform-d was used as supplied for samples which were not air- and moisture-sensitive.

NMR spectra were recorded on either a Bruker Avance III HD NanoBay NMR (9.4 T, 400.2 MHz), a Bruker Avance III NMR (11.75 T, 499.9 MHz) or a Bruker Avance NMR (11.75 T, 500.3 MHz) with a $^{13}C$-detect cryoprobe. Spectra were recorded at 298 K unless otherwise stated and referenced internally to the residual protio solvent resonance. Chemical shifts, 5, are reported in parts per million (ppm) relative to tetramethylsilane (5=0 ppm). Air-sensitive samples were prepared in a glovebox under an inert atmosphere of nitrogen, using dried deuterated solvents and sealed in 5 mm Young's tap NMR tubes. Solid-state NMR spectra were recorded by Dr Nicholas Rees (University of Oxford) on a Bruker Avance III HD NanoBay solid-state NMR spectrometer (9.4 T, 399.9 MHz). Samples were spun at the magic angle at spin rates of 10 kHz for $^{13}C$ and $^{29}Si$, and 20 kHz for $^{27}Al$. $^{13}C$ NMR spectra were referenced to adamantane, $^{27}Al$ to aluminium nitrate, and $^{29}Si$ to kaolinite.

Single-crystal X-ray diffraction data collection and structure determination were performed by Dr Zoë R. Turner (University of Oxford). Crystals were mounted on MiTeGen MicroMounts using perfluoropolyether oil and rapidly transferred to a goniometer head on a diffractometer fitted with an Oxford Cryosystems Cryostream open-flow nitrogen cooling device.[2] Data collections were carried out at 150 K on an Oxford Diffraction Supernova diffractometer using mirror-monochromated Cu Kα radiation (λ=1.54178 A) and data were processed using CryAlisPro.[3] The structures were solved using direct methods (SIR-92)[4] or a charge flipping algorithm (SUPERFLIP)[5] and refined by full-matrix least-squares using the Win-GX software suite.[6] Molecular bond lengths and angles were calculated, where required, using PLATON.[7] Illustrations of the solid state molecular structures were created using ORTEP.[8] Thermal ellipsoids were shown at 30% probability.

Gel permeation chromatography (GPC) was performed by Ms Liv Thobru and Ms Sara Herum (Norner AS, Norway) on a high temperature gel permeation chromatograph with an IR5 infrared detector (GPC-IR5). Samples were prepared by dissolution in 1,2,4-trichlorobenzene (TCB) containing 300 ppm of 3,5-di-tert-buty-4-hydroxytoluene (BHT) at 160° C. for 90 minutes and then filtered with a 10 µm SS filter before being passed through the GPC column. The samples were run under a flow rate of 0.5 mL $min^{-1}$ using TCB containing 300 ppm of BHT as mobile phase with 1 mg $mL^{-1}$ BHT added as a flow rate marker. The GPC column and detector temperature were set at 145 and 160° C. respectively.

Differential scanning calorimetry was performed on a Mettler Toledo TGA/DSC 1 System within a temperature range of 25-180° C. at a rate of 10 K $min^{-1}$. Polymer samples were sealed in 100 µL aluminium crucibles. An empty crucible was used as a reference, and the DSC was calibrated using indium.

2,3,4,5,6,7-hexamethylindene (SCG Chemicals Co., Ltd.), $^{n}$BuLi (1.6 M in hexanes, Sigma Aldrich), 4-methyl-2-tert-butylphenol (Sigma Aldrich), 6-bromo-2,4-di-tert-butylphenol (Alfa Aesar), and bromine (Sigma Aldrich) were all used as received. $TiCl_4$·2THF was prepared according to a literature procedure.[9] $Et_3N$ was dried over KOH, distilled under static vacuum and freeze-pump-thaw degassed before use. 2,4-bis(α,α-dimethylbenzyl)phenol (Sigma Aldrich) was recrystallized from hot ethanol before use. $Me_2SiCl_2$ (Sigma Aldrich) was dried over pre-activated 3 Å molecular sieves before use. Allyl bromide was washed with $NaHCO_3$ followed by distilled water and dried over $MgSO_4$. Ethylene was supplied by CK Special Gases Ltd was passed through molecular sieves before use. Solid polymethylaluminoxane (sMAO) was supplied by SCG Chemicals Co., Ltd. (Thailand) as a slurry in toluene which was dried under vacuum before use. MAO was supplied by Chemtura Corporation as a slurry in toluene which was dried under vacuum before use.

Synthesis of PHEN-I* Compounds

Synthesis of $^{Me(R1)}$SB($^{R,R'}$ArO,I*)$MCl_2$. ($R^1$=Me, $^{n}$Pr, Ph, R, R'=$^{t}$Bu, Me; $^{t}$Bu, $^{t}$Bu; cumyl, cumyl, M=Ti, Zr.)

Having regard to Scheme 1 below, electrophilic ortho bromination of the starting phenol was achieved quantitatively in a stoichiometric reaction in DCM stirred for 90 minutes. Allyl protection was carried out by the dropwise addition of a solution of bromodialkylphenol and 1.5 equivalents of allyl bromide to a 10% aqueous solution of 1.5 equivalents NaOH. The protected bromophenols were treated with 1.3 equivalents of $^{n}$BuLi at −78° C. and then 3 equivalents of Me($R^1$)$SiCl_2$ to afford the desired chlorosilyl intermediates in good yields (57-83%). Stirring these intermediates with Ind #Li in THF overnight afforded the allyl-protected proligands in a 75% yield on multigram scales. The proligands were treated with $^{n}$BuLi in the presence of triethylamine, followed by the addition of $MCl_4$·2THF. Following work-up, the resulting brick-red solid products were washed with pentane to afford titanium dichloro complexes, $^{Me(R1)}$SB($^{R,R'}$ArO,I*)$MCl_2$, in yields of 19-30%.

Scheme 1. Synthesis of $^{Me(R1)}$SB($^{R,R'}$ArO, I*)$MCl_2$, ($R^1$ = Me, $^{n}$Pr, Ph. R, R′ = $^{t}$Bu, Me; $^{t}$Bu, $^{t}$Bu; cumuyl, cumyl. M = Ti, Zr.)

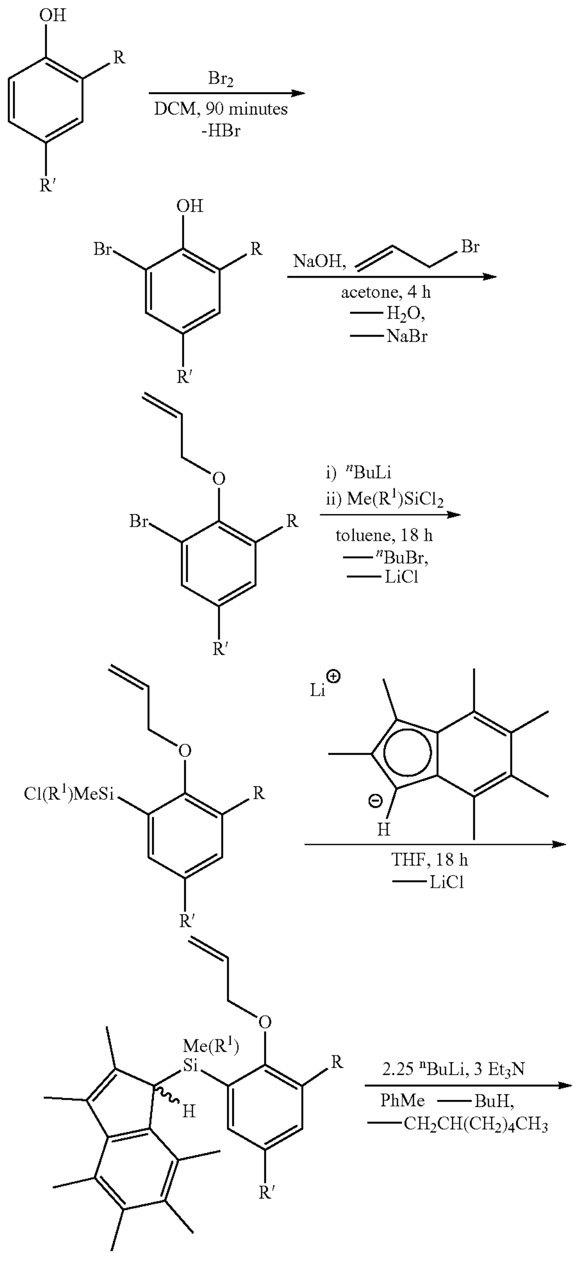

-continued

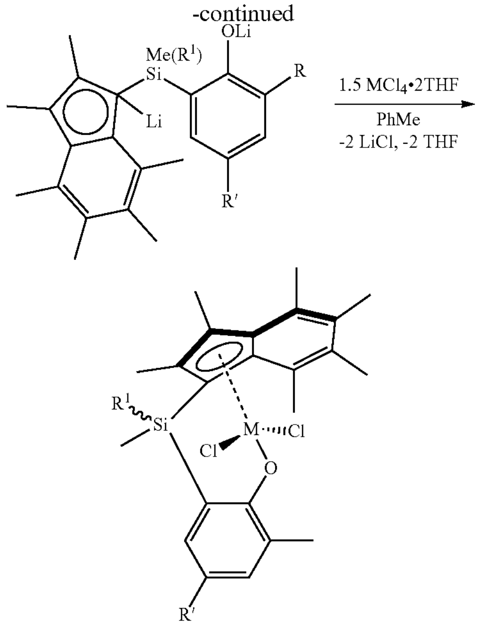

PHENI*

$R^1$ = Me, $^{n}$Pr, Ph
(R, R′) = ($^{t}$Bu, Me), $^{t}$Bu, $^{t}$Bu), (Cumyl, Cumyl)
M = Ti, Zr The $^1$H NMR spectra of $^{Me2}$SB($^{tBu2}$ArO,I*)$TiCl_2$ (FIG. 30A) displays the diagnostic resonances of PHENI* complexes. The spectrum contains six I*-Me singlets between 2.66 and 1.96 ppm, $^{t}$Bu singlets between 1.50 and 1.38 ppm, dimethylsilyl singlets between 0.72 and 0.66 ppm and an aromatic pair of doublets between 7.58 and 7.19 ppm for the meta aryl protons with a $^4J_{H-H}$ constant of 2 Hz. The solid-state structure and table of crystallographic parameters of $^{Me2}$SB($^{tBu2}$ArO,I*)$TiCl_2$ are shown in FIG. 30B. Spectral assignments for $^{Me2}$SB($^{tBu2}$ArO,I*)$TiCl_2$ and other selected $^{Me(R1)}$SB($^{R,R'}$ArO,I*)$MCl_2$ compounds are outlined below.

$^{Me2}$SB($^{tBu2}$ArO,I*)$TiCl_2$ $^1$H NMR (400 MHz, benzene-$d_6$, 298 K): δ 7.58 (d, $^4J_{H-H}$=2.4 Hz, 1H, 3,5-$C_6H_2$), 7.56 (d, $^4J_{H-H}$=2.4 Hz, 1H, 3,5-$C_6H_2$), 2.65 (s, 3H, I*Me), 2.55 (s, 3H, I*Me), 2.12 (s, 3H, I*Me), 2.05 (s, 3H, I*Me), 2.02 (s, 3H, I*Me), 1.96 (s, 3H, I*Me), 1.50 (s, 9H, $CMe_3$), 1.38 (s, 9H, $CMe_3$), and 0.72 (s, 6H, SiMe) ppm.

$^{13}C\{^1H\}$ NMR (126 MHz, benzene-$d_6$, 298 K): δ 167.32 (1-$C_6H_2$), 146.91 (2,4-$C_6H_2$), 144.39 (I*), 137.60 (I*), 136.61 (I*), 136.15 (I*), 136.10 (2,4-$C_6H_2$), 133.14 (6-$C_6H_2$), 132.24 (I*), 131.61 (I*), 130.65 (I*), 130.62 (I*), 127.07 (3,5-$C_6H_2$), 124.87 (3,5-$C_6H_2$), 110.40 (I*Si), 35.11 ($CMe_3$), 34.61 ($CMe_3$), 31.44 ($CMe_3$), 29.73 ($CMe_3$), 21.37 17.11 16.88 16.29 16.12 15.47 (I*Me), 3.35 and 1.44 (SiMe) ppm.

$^{Me2}$SB($^{tBu,Me}$ArO,I*)$TiCl_2$ $^1$H NMR (400 MHz, benzene-$d_6$, 298 K): δ 7.22 (d, $^4J_{H-H}$=1.9 Hz, 1H, 3,5-$C_6H_2$), 7.19 (d, $^4J_{H-H}$=2.0 Hz, 1H, 3,5-$C_6H_2$), 2.66 (s, 3H, I*Me), 2.56 (s, 3H, I*Me), 2.27 (s, 3H, 4-C6H2Me), 2.14 (s, 3H, I*Me), 2.03 (s, 3H, I*Me), 2.02 (s, 3H, I*Me), 1.98 (s, 3H, I*Me), 1.46 (s, 9H, $CMe_3$), 0.68 (s, 3H, SiMe) and 0.66 (s, 3H, SiMe) ppm.

$^{13}C\{^1H\}$ NMR (126 MHz, benzene-$d_6$, 298 K): δ 167.79 (1-$C_6H_2$), 144.68 (I*), 138.03 (I*), 136.99 (2-$C_6H_2$), 136.95 (I*), 136.51 (I*), 134.04 (6-$C_6H_2$), 133.98

($4-C_6H_2$), 132.50 (I*), 131.98 (I*), 131.37 ($3,5-C_6H_2$), 131.22 (I*), 131.01 (I*), 129.04 ($3,5-C_6H_2$), 110.75 (I*Si), 35.12 ($CMe_3$), 30.05 ($CMe_3$), 21.81 (I*Me), 21.44 ($4-C_6H_2Me$), 17.46 17.26 16.66 16.50 15.69 (I*Me), 3.62 and 1.49 (SiMe) ppm.

$^{Me2}SB(^{Cumyl2}ArO,I^*)TiCl_2$ $^1H$ NMR (400 MHz, benzene-$d_6$, 298 K): δ 7.51 (d, $^4J_{H-H}$=2.4 Hz, 1H, $3,5-C_6H_2$), 7.46 (d, $^4J_{H-H}$=2.4 Hz, 1H, $3,5-C_6H_2$), 7.37-7.17 (m, 8H, $CMe_2Ph$), 7.13-7.07 (m, 1H, $CMe_2Ph$), 7.06-7.00 (m, 1H, $CMe_2Ph$), 2.62 (s, 3H, I*Me), 2.42 (s, 3H, I*Me), 2.09 (s, 3H, I*Me), 2.00 (s, 3H, I*Me), 1.98 (s, 3H, I*Me), 1.90 (s, 3H, I*Me), 1.73 (s, 6H, $CMe_2Ph$), 1.70 (s, 3H, $CMe_2Ph$), 1.67 (s, 3H, $CMe_2Ph$) 0.60 (s, 3H, SiMe) and 0.59 (s, 3H, SiMe) ppm.

$^{13}C\{^1H\}$ NMR (126 MHz, benzene-$d_6$, 298 K): δ 166.74 (Ar), 151.09 (Ar), 169.81 (Ar), 146.72 (Ar), 144.62 (Ar), 137.54 (Ar), 136.74 (Ar), 136.51 (Ar), 136.28 (Ar), 133.84 ($6-C_6H_2$), 132.43 (Ar), 131.65 (Ar), 130.97 (Ar), 130.74 (Ar), 129.83 ($3,5-C_6H_2$), 128.46 ($CMe_2Ph$), 128.35 ($CMe_2Ph$), 128.32 ($CMe_2Ph$), 128.16 ($CMe_2Ph$), 127.97 ($CMe_2Ph$), 127.68 ($3,5-C_6H_2$), 127.13 ($CMe_2Ph$), 126.39 ($CMe_2Ph$), 126.19 ($CMe_2Ph$), 125.58 ($CMe_2Ph$), 110.69 (I*Si), 43.34 and 42.92 ($CMe_2Ph$), 31.26 31.23 30.60 29.00 ($CMe_2Ph$), 21.65 17.44 17.31 16.65 16.39 15.66 (I*Me), 3.93 1.41 (SiMe) ppm. An additional aromatic resonance was expected by not observed.

Synthesis of $^{Me2}SB(^{R,R'}ArO,I^*)TiR''_2$(R''=Br, I, OEt, $NMe_2$, Me, $CH_2SiMe_3$, $O^{iPr2}Ar$)

Having regard to Scheme 2 below, the ancillary chloride ligands were replaced by various other ligands, including halide, alkyl, alkoxide, aryloxide, and amide groups in quantitative yields in stoichiometric reactions performed in benzene or benzene-$d_6$. The halide complexes were synthesised using bromotrimethylsilane and iodotrimethylsilane respectively, with the remaining complexes synthesised using the relevant alkali metal salts.

Scheme 2. Synthesis of $^{Me}{}_2SB(^{R,R'}ArO, I^*)$ $TiR''_2$ (R'' = Br, I, OEt, $NMe_2$, Me, $CH_2SiME_3$, $O^{iPR2}Ar$)

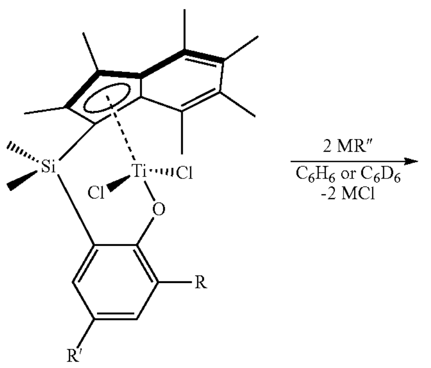

-continued

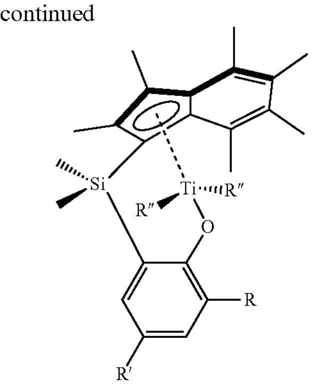

M = Li, Na, K, or $Me_3Si$
R² = Br, I, OEt, $NMe_2$, Me, $CH_2SiMe_3$, $O^{iPr2}Ar$

Synthesis of Supported PHEN-I* Compounds sMAO-$^{Me2}SB(^{R,R'}ArO,I^*)TiR''_2$ sMAO (40.2 wt % Al, 250 mg, 3.72 mmol [Al]) was combined with 0.005 equivalents of PHEN-I* compound (0.0186 mmol [Ti]) and the physical mixture homogenised thoroughly. Toluene (50 mL) was then added and the mixture was heated to 60° C. with frequent swirling for one hour, or until the solution had become colourless. After settling, the toluene supernatant was decanted, the solid product was dried under vacuum at 23° C. for 2 hours and recovered in 75-90% yields.

SSMAO-$^{Me2}SB(^{R,R'}ArO,I^*)TiR''_2$

Silica supported MAO (SSMAO) was synthesised by treating silica (PQ-ES70X, calcined at 600° C. for 6 hours) with 40 wt % dMAO. SSMAO was combined with 0.005 equivalents of PHEN-I* compound and the physical mixture homogenised thoroughly. Toluene (50 mL) was then added and the mixture was heated to 60° C. with frequent swirling for one hour, or until the solution had become colourless. After settling, the toluene supernatant was decanted, the solid product was dried under vacuum at 23° C. for 2 hours.

$Mq_3Al—CO_3$-1H/MAO-$^{Me2}SB(^{R,R'}ArO,I^*)TiR''_2$

Layered double hydroxide-supported MAO (LDHMAO) was synthesised from a 1-hexanol-washed magnesium-aluminium LDH, $Mg_3Al—CO_3$-1H (calcined at 150° C. for 6 hours) treated with 40 wt % dMAO. LDHMAO was combined with 0.005 equivalents of PHEN-I* compound and the physical mixture homogenised thoroughly. Toluene (50 mL) was then added and the mixture was heated to 60° C. with frequent swirling for one hour, or until the solution had become colourless. After settling, the toluene supernatant was decanted, the solid product was dried under vacuum at 23° C. for 2 hours.

Polymerisation Studies

Ethylene Homopolymerisation

Slurry-phase ethylene polymerisation studies were conducted with 10 mg of supported catalyst in 50 mL hexanes in 150 mL Rotaflo ampoules with 2 bar monomer pressure and 150 mg TIBA acting as a co-catalytic initiator and scavenger.

Figure 1A:
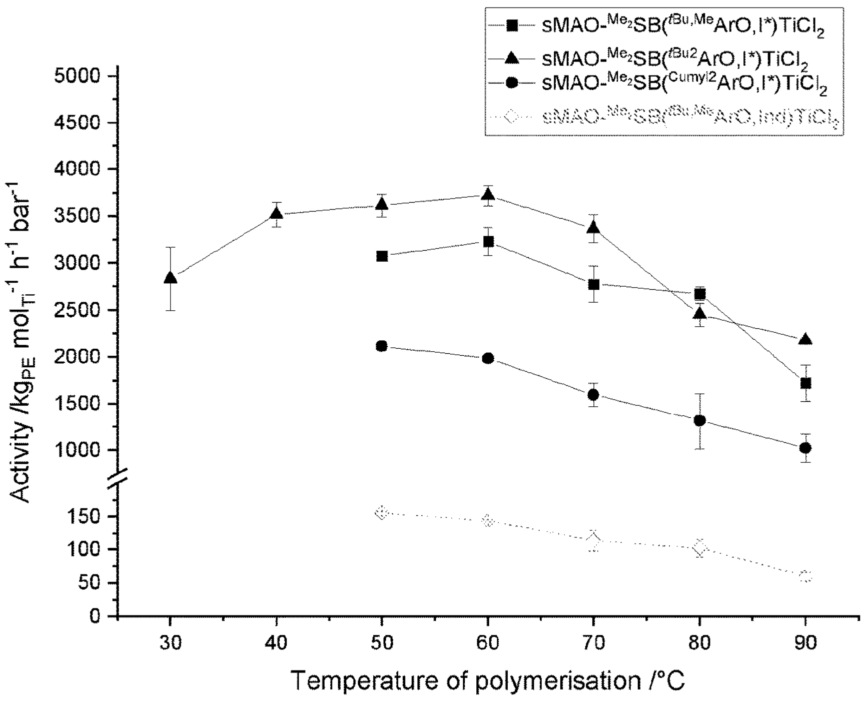
Figure 1A:
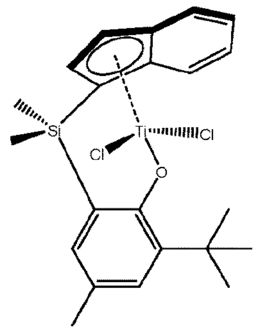
Figure 1B:
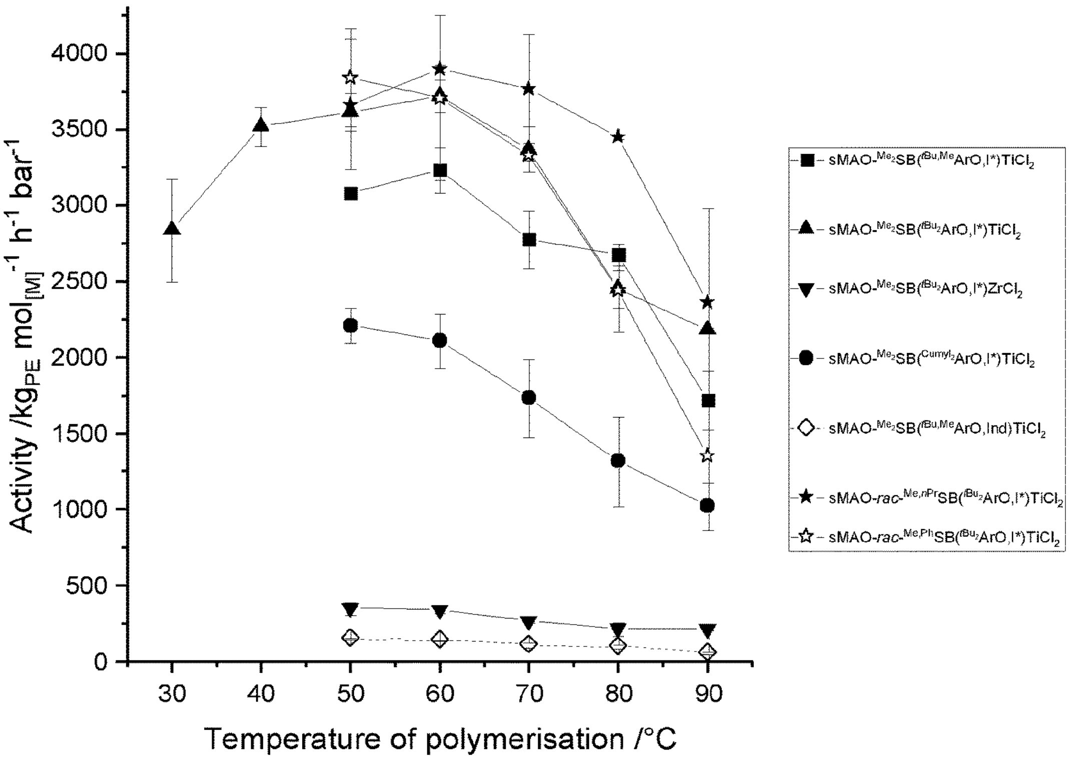
Figure 2A:
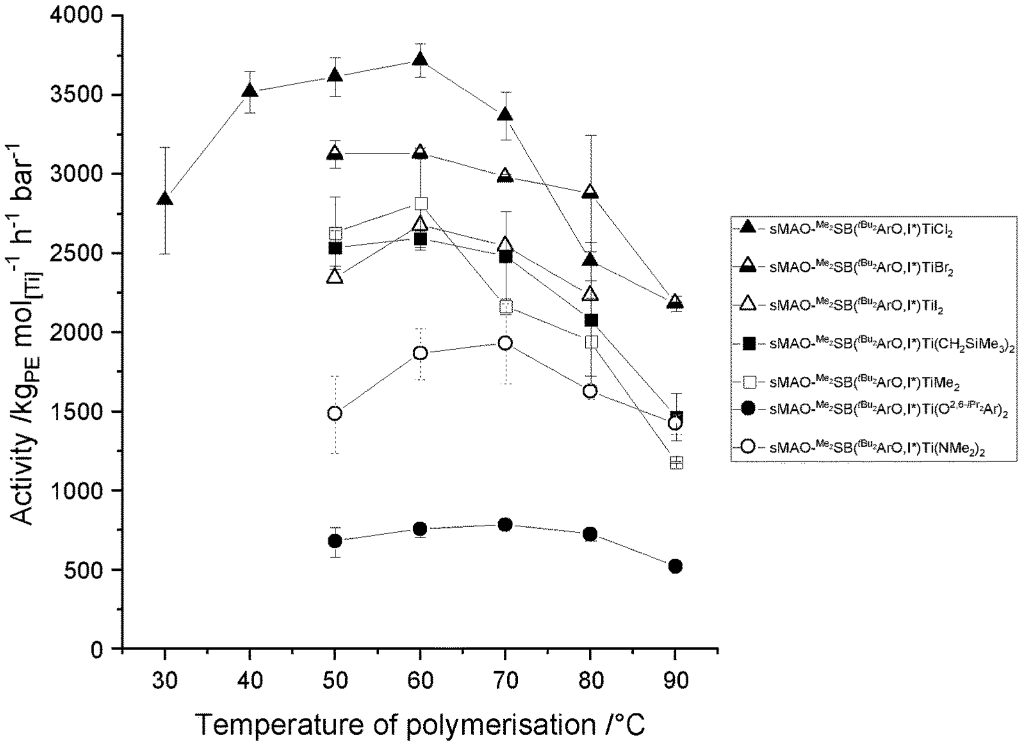
Figure 2B:
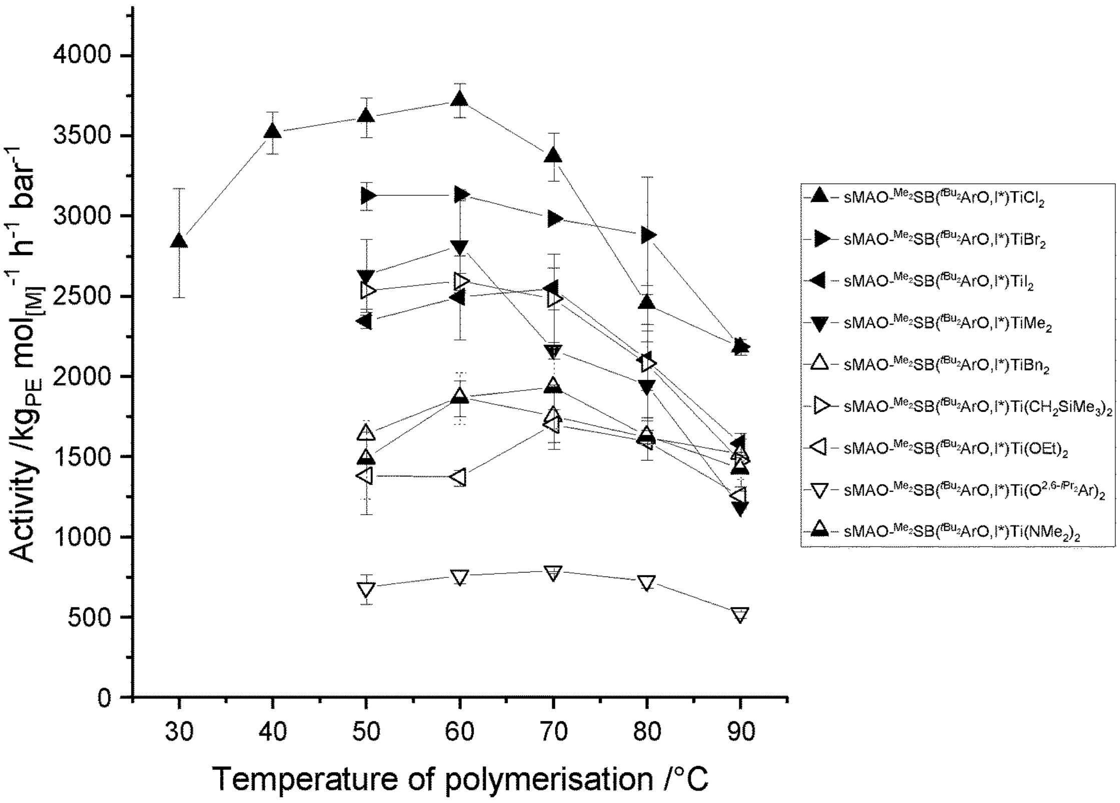

FIGS. 1A and 1B show that all of the sMAO-supported titanium dichloro PHEN-I* complexes show dramatically higher ethylene polymerisation activity compared with the comparator sMAO-supported indenyl-PHENICS complex. FIGS. 2A and 2B show that high ethylene polymerisation activity was also observed when chloro was replaced with other ancillary ligands.

Figure 3A:
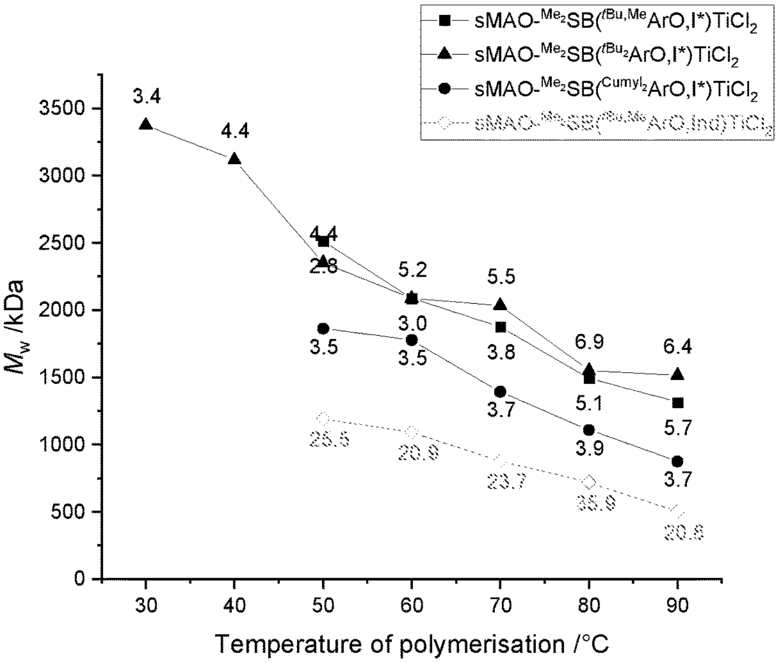
Figure 3A:
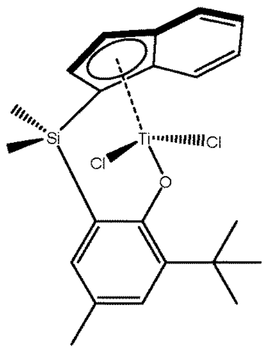
Figure 3B:
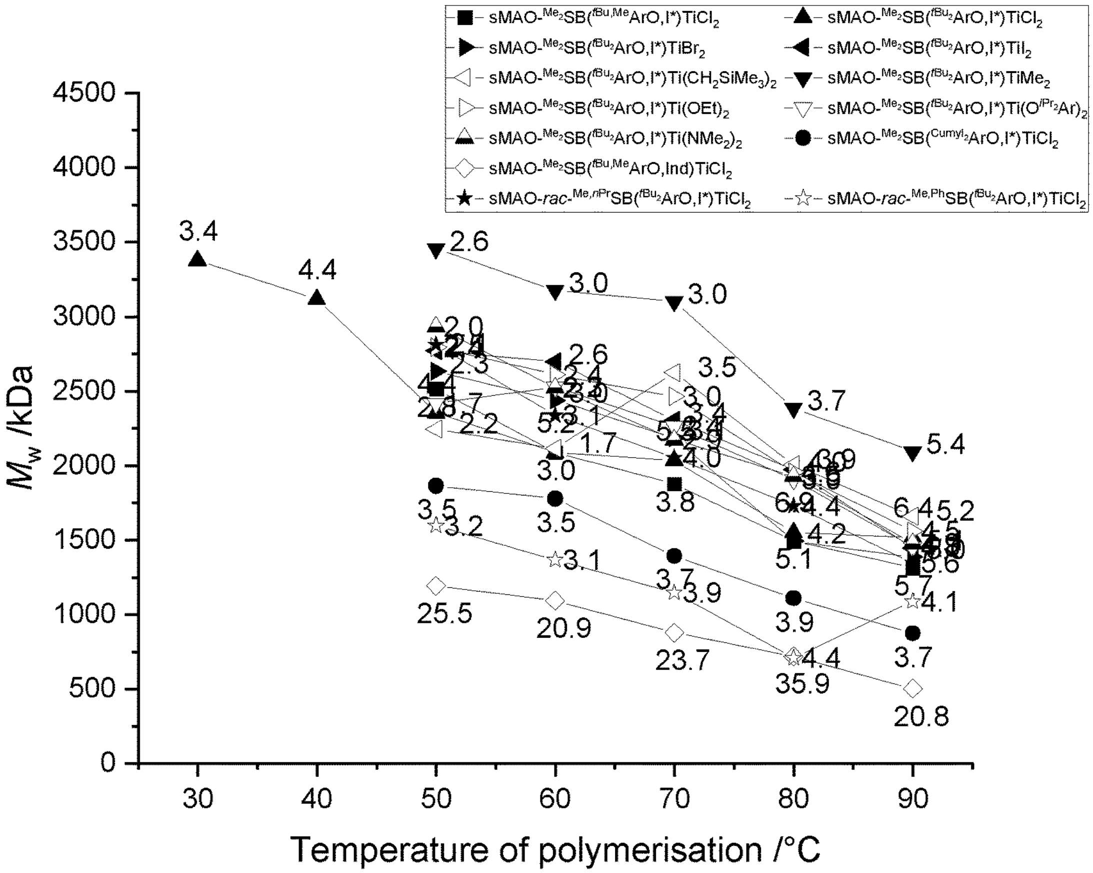

Gel permeation chromatography shows that the polyethylene produced by sMAO-supported PHEN-I* complexes can be characterised as Ultra-High Molecular Weight Polyethylene (UHMWPE), with molecular weights on the order of $10^6$-$10^7$ Da (see FIGS. 3A and 3B). In all cases, molecular weight decreases with increasing polymerisation temperature. The molecular weight of polyethylene produced by sMAO-$^{Me_2}$SB($^{tBu_2}$ArO,I*)$TiCl_2$ ranges from 1.52 MDa at 90° C. to 3.38 MDa at 30° C., greater than the tert-butyl-methyl and bis-cumyl complexes, and a substantial increase over the comparator sMAO-supported indenyl-PHENICS complex. Moreover, all of the sMAO-supported PHEN-I* compounds resulted in polyethylene having a substantially lower polydispersity than that obtained with the comparator sMAO-supported indenyl-PHENICS complex.

Figure 4:
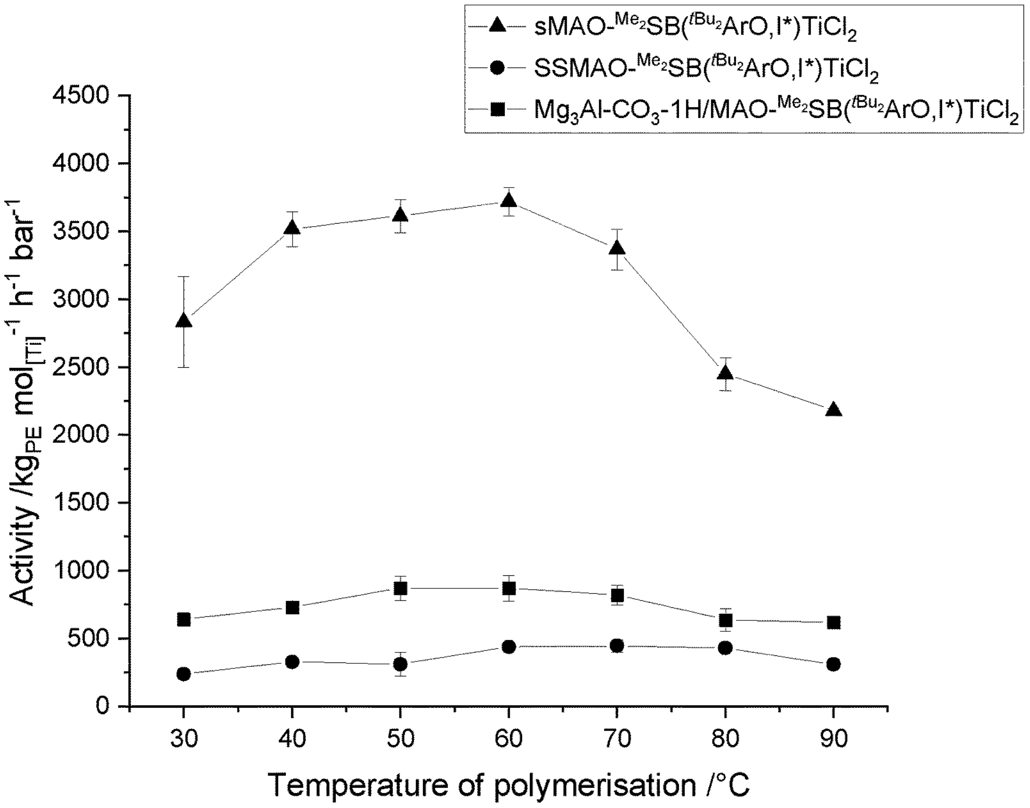

FIG. 4 shows replacing the sMAO supporting substrate with silica-supported MAO and LDH-supported MAO resulted in reduced ethylene polymerisation activity, albeit still higher than that observed with the comparator sMAO-supported indenyl-PHENICS complex.

Figure 5A:
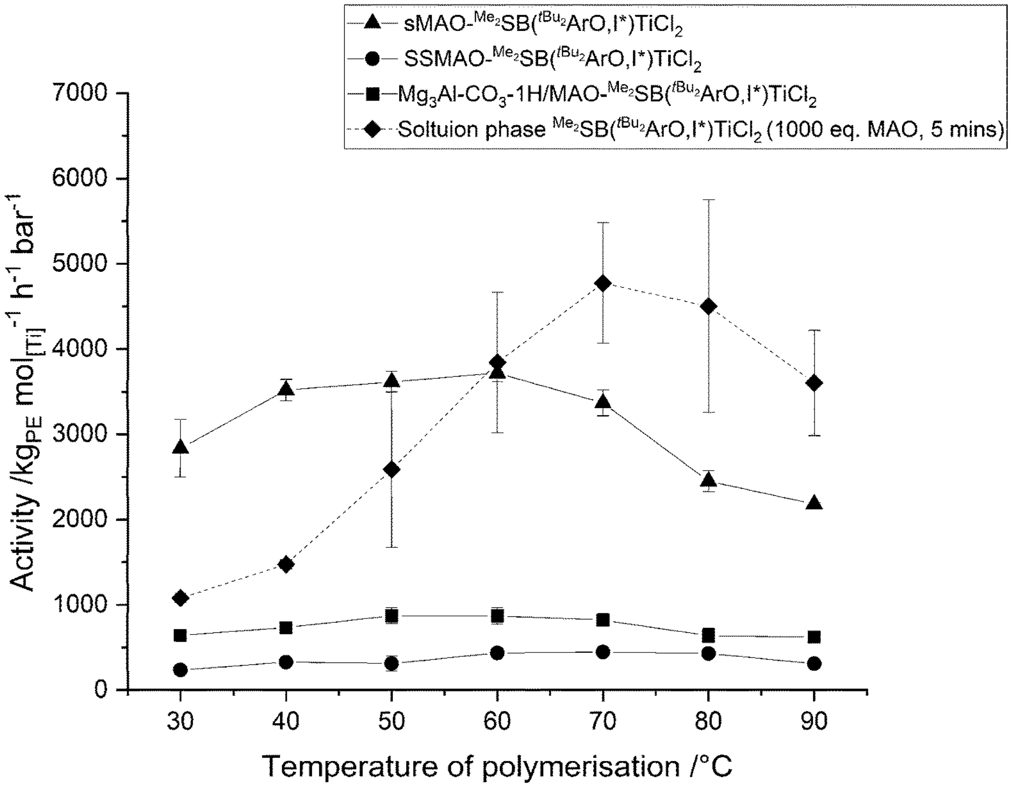
Figure 5B:
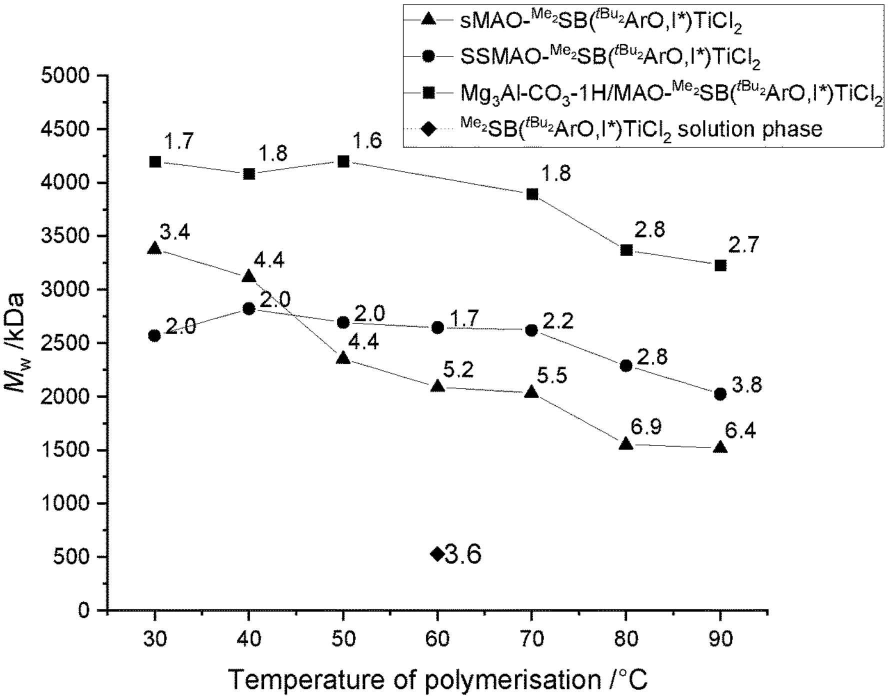
Figure 5C:
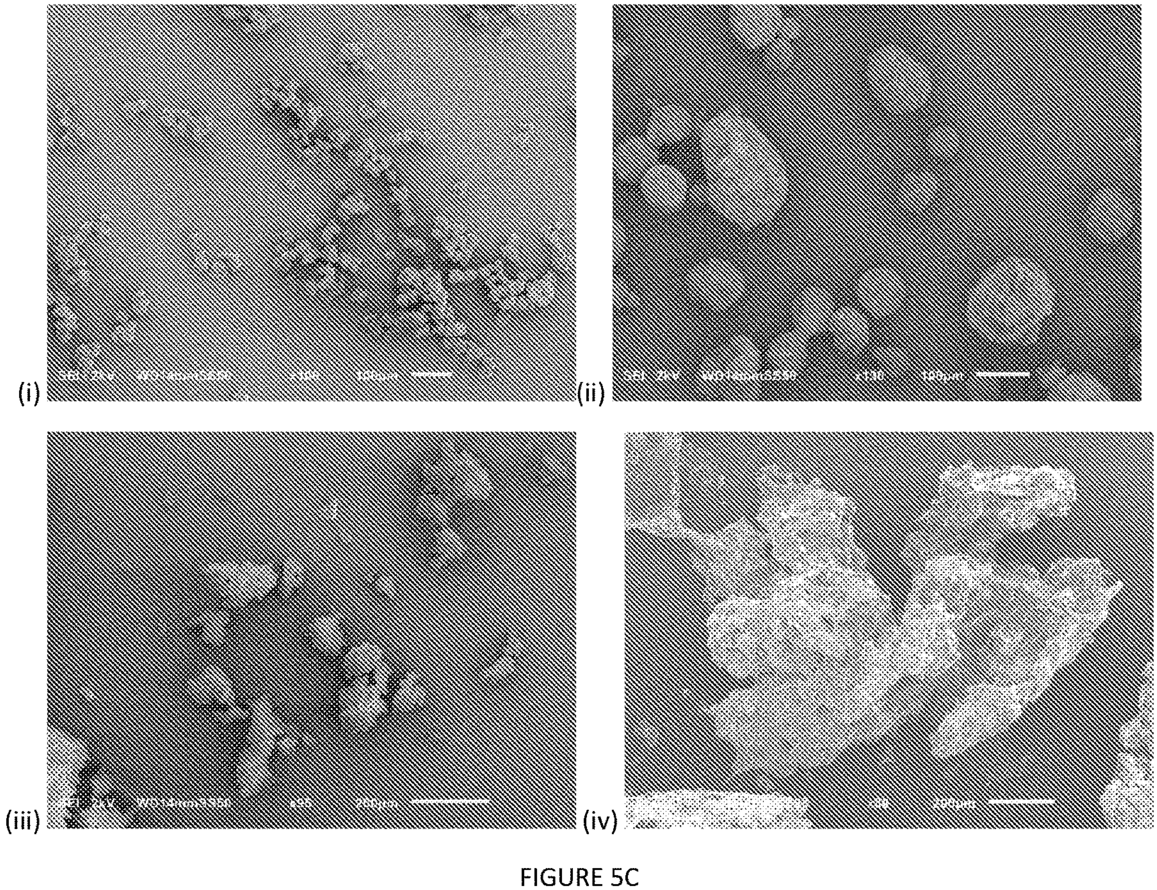
Figure 6:
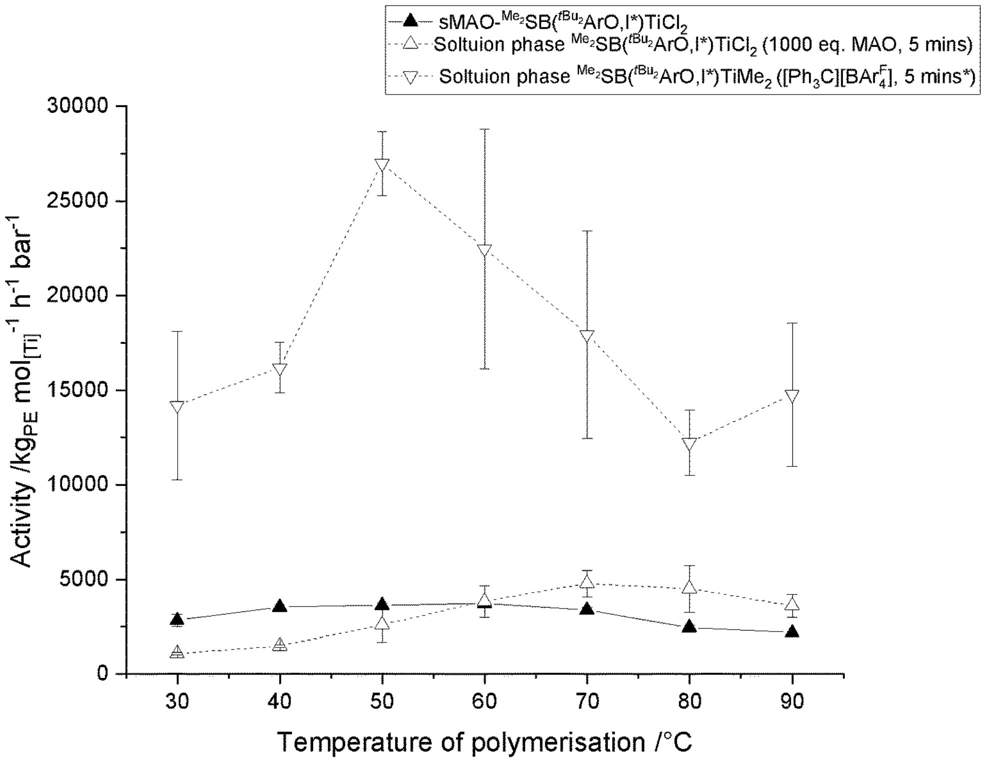
Figure 7:
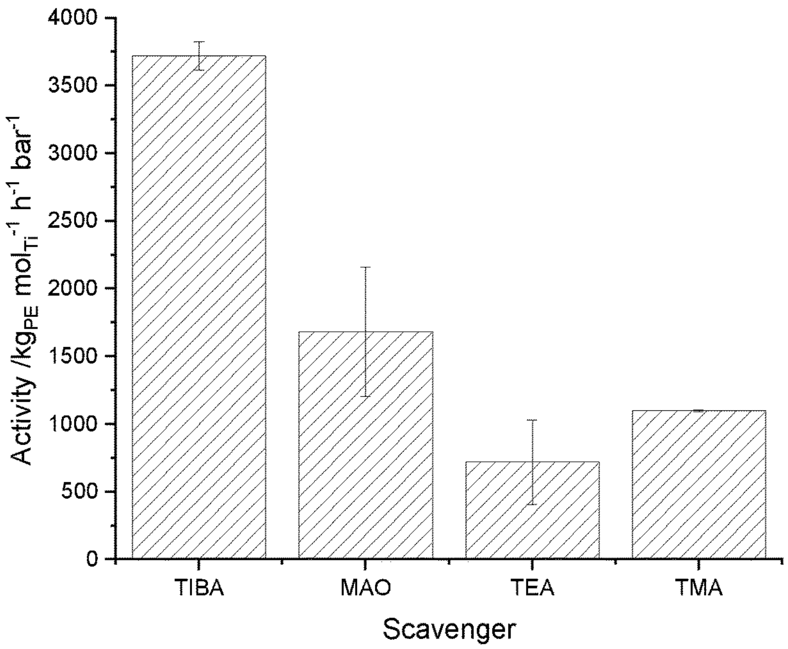
Figure 8:
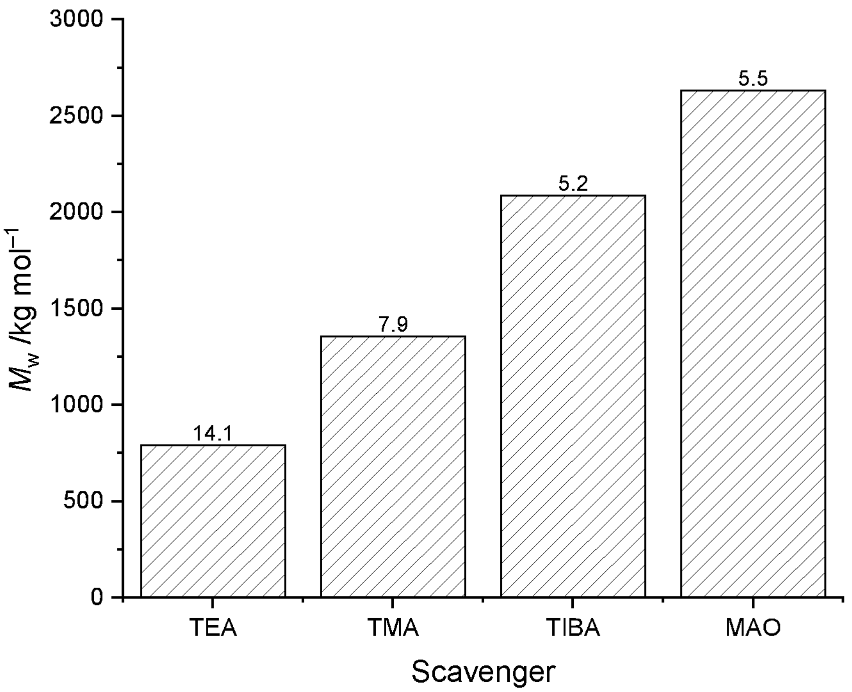
Figure 9:
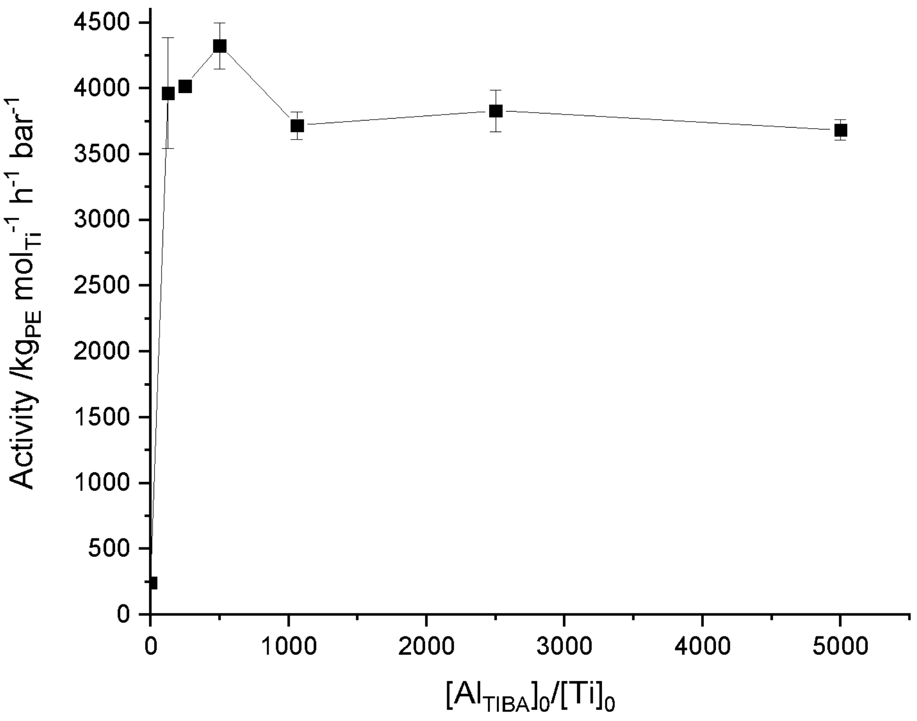
Figure 10:
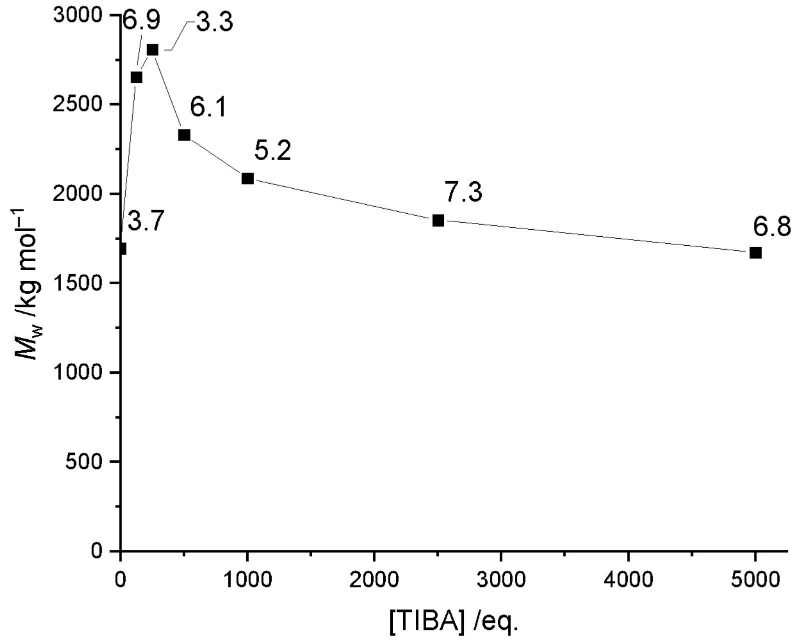
Figure 11:
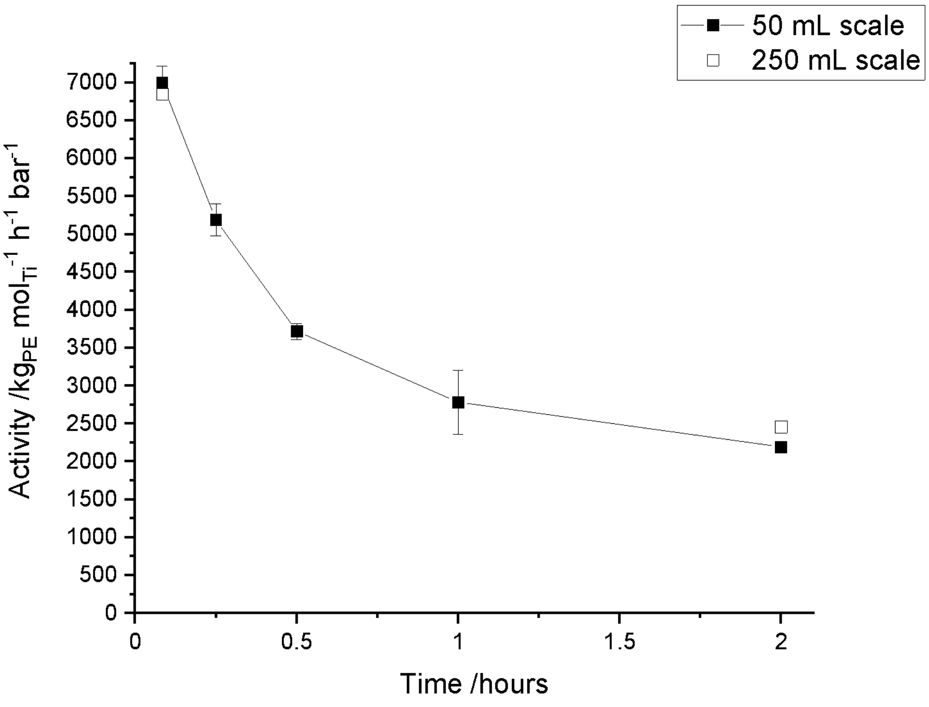
Figure 12:
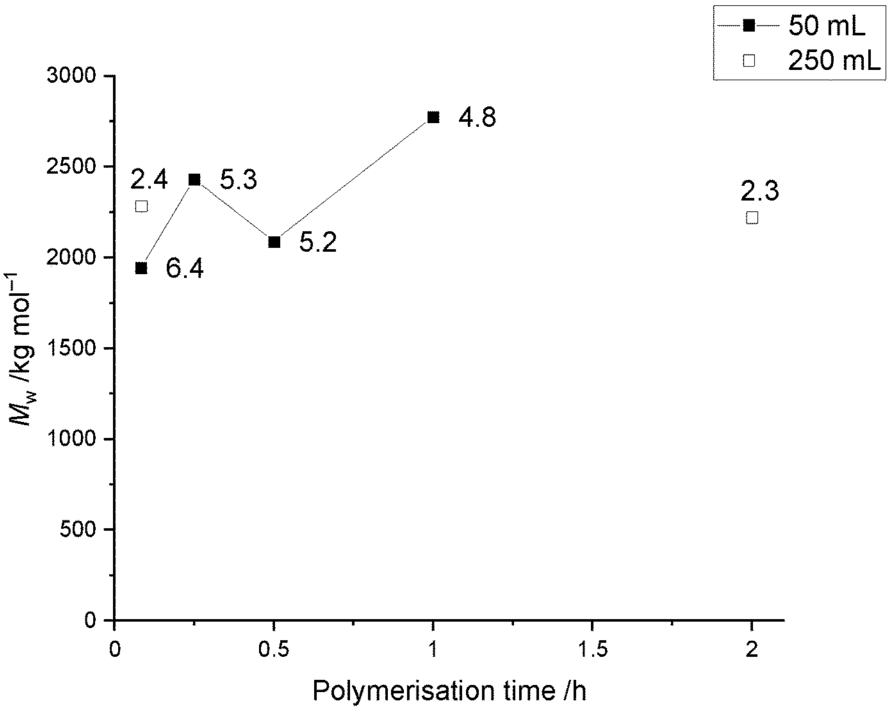
Figure 13:
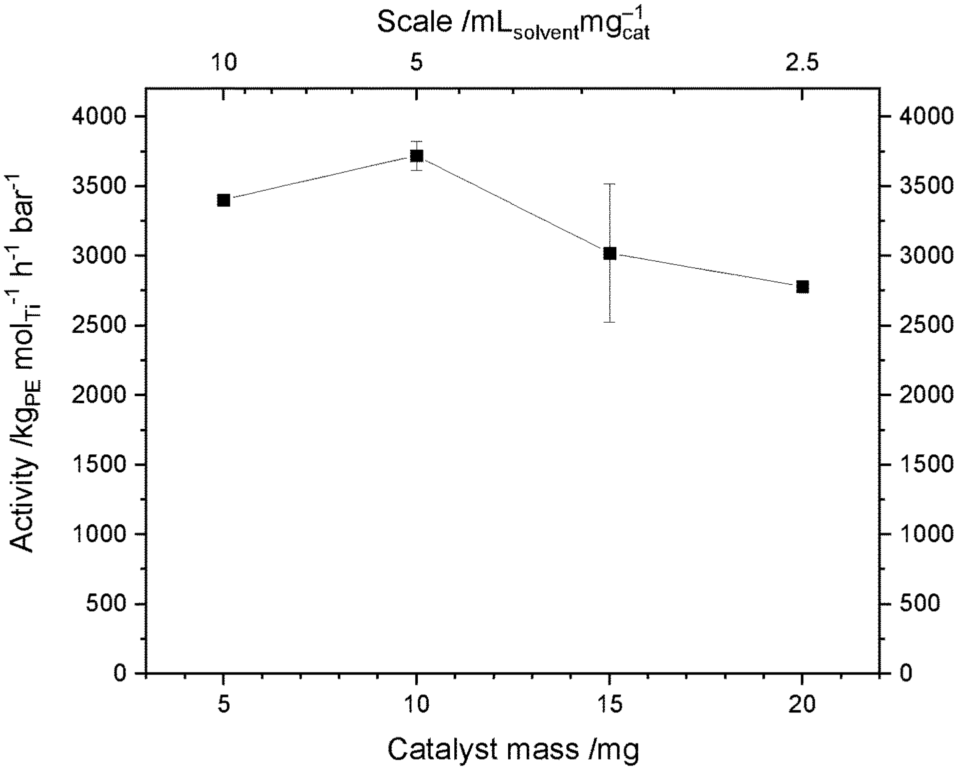
Figure 14:
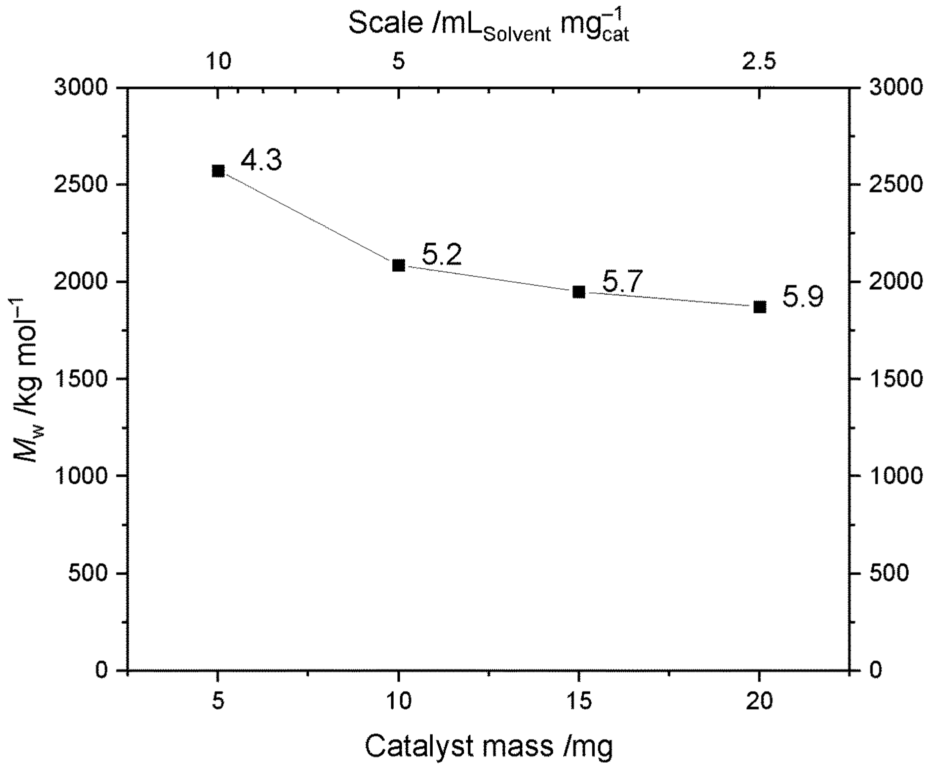

FIG. 5A illustrates that even higher ethylene polymerisation activity was achieved when no supporting substrate is used and the polymerisation is conducted in the solution phase. FIG. 5B shows the effect of supporting substrate on the molecular weight of the resulting polyethylene. FIG. 5C shows scanning electron micrographs of polyethylene synthesised under slurry phase (i-iii) and solution phase (iv) conditions.

Condition optimisation was performed for the homopolymerisation of ethylene with sMAO-$^{Me_2}$SB($^{tBu_2}$ArO,I*)$TiCl_2$, by studying the effects of varying the alkyl aluminium cocatalyst and its loading, reaction time and scale. Stoichiometric activation of $^{Me2}$SB($^{tBu2}$ArO,I*)$TiMe_2$ with $[Ph_3C][BAr^F_4]$ (trityl perfluoroarylborate, TB) led to dramatically higher activities than either the $^{Me2}$SB($^{tBu2}$ArO,I*)$TiCl_2$/MAO or sMAO-$^{Me2}$SB($^{tBu2}$ArO,I*)$TiCl_2$ systems. It was found that using TIBA as the cocatalyst led to the highest polymerisation activities, with the greatest activity recorded with $[Al_{TIBA}]_0/[Ti]_0=500$ (see FIGS. 6-14).

Ethylene Copolymerisation

Figure 15A:
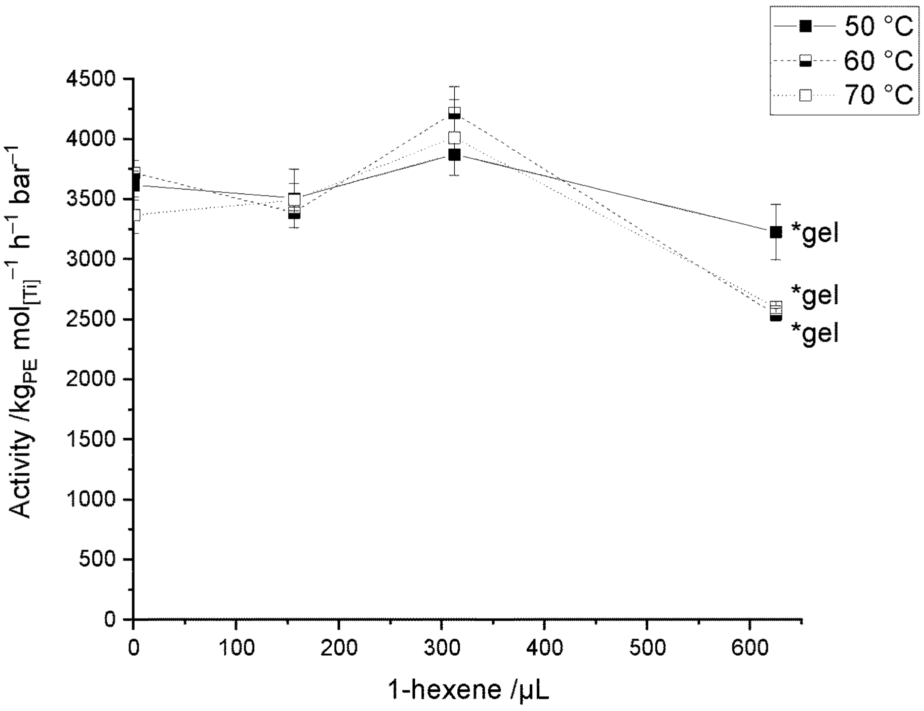
Figure 15B:
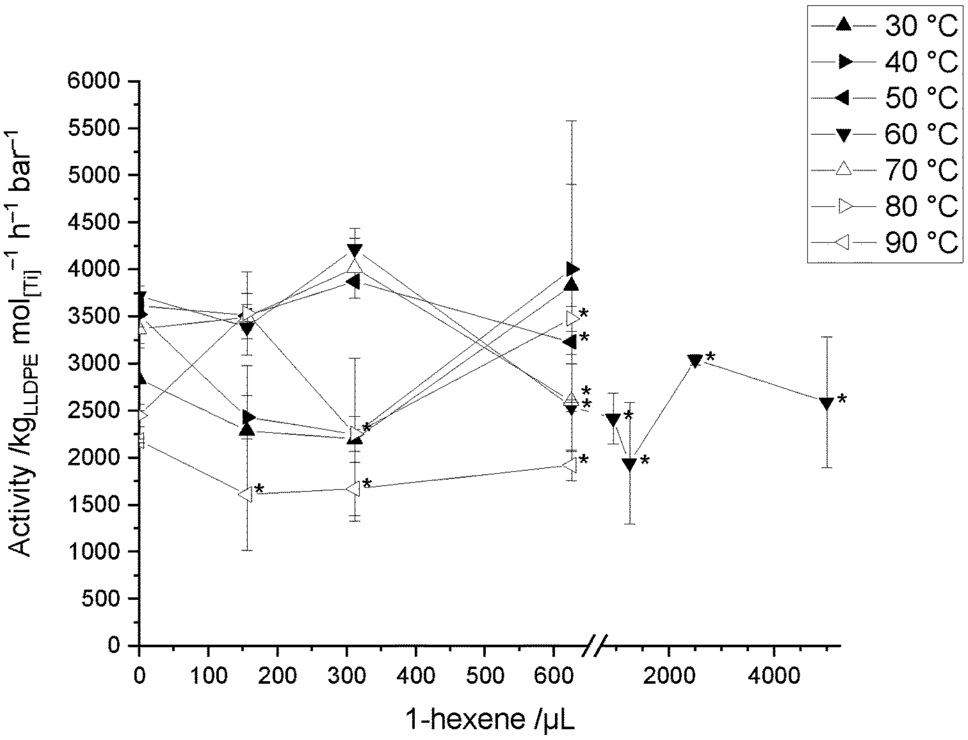
Figure 16:
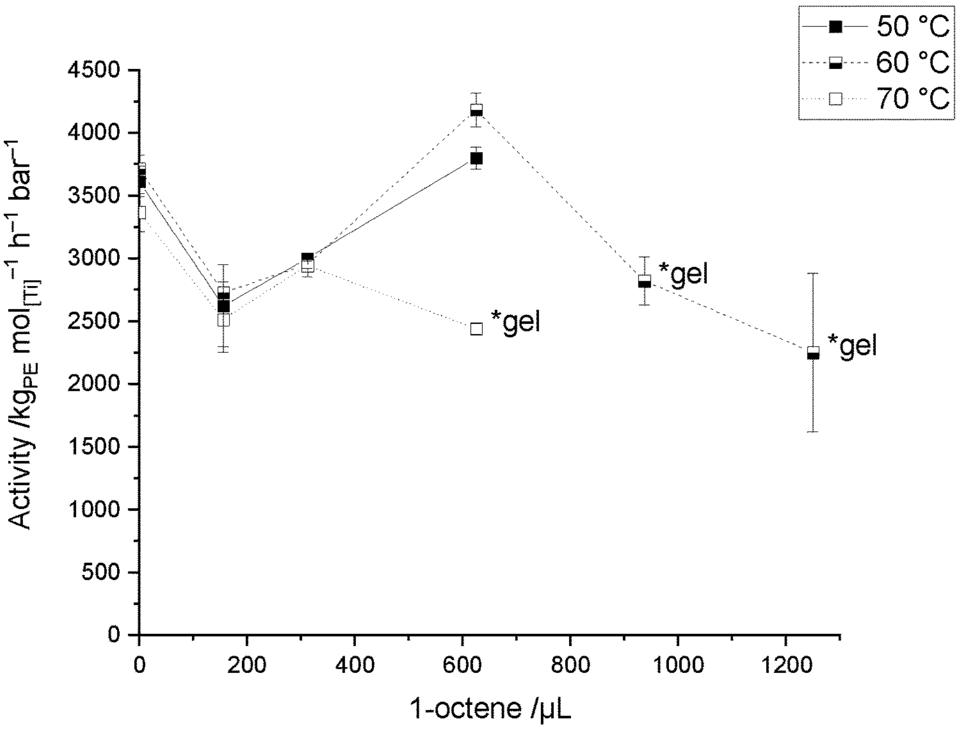

Slurry phase copolymerisations were performed using sMAO-$^{Me_2}$SB($^{tBu_2}$ArO,I*)$TiCl_2$ and varying amounts of 1-hexene and 1-octene. A positive comonomer effect was observed with both 1-hexene and 1-octene copolymerisations (see FIGS. 15A, 15B and 16). At higher temperatures and greater comonomer loadings, the copolymer formed as a soluble gel resulting in restricted diffusion within the reaction mixture leading to lower activities.

Figure 17:
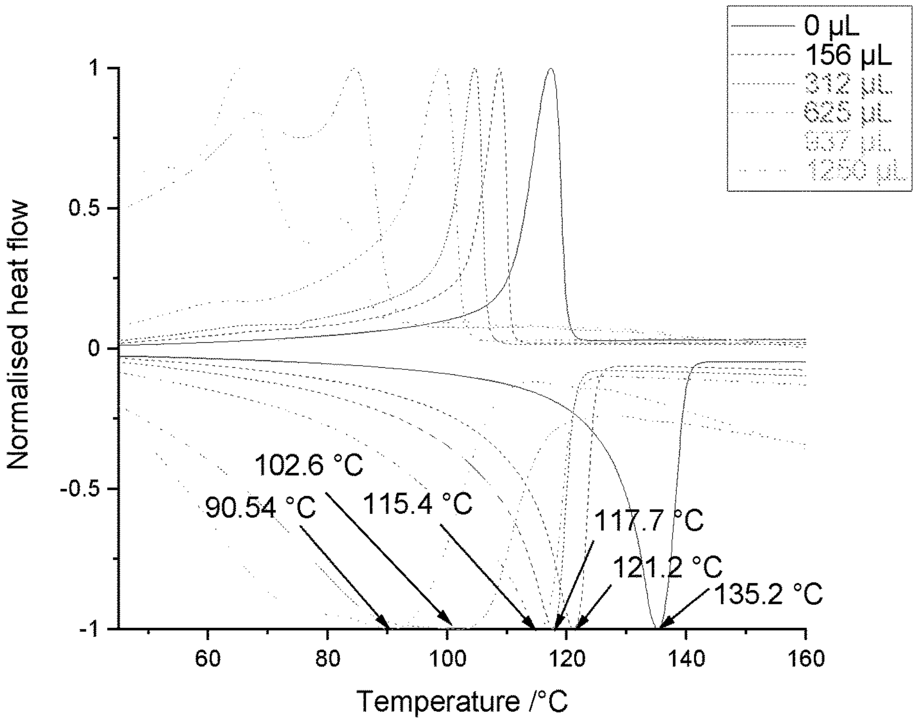
FIG. 17 shows differential scanning calorimetry plot (10 K $min^{-1}$) of polyethylene-co-octene produced by sMAO-$^{Me2}SB(^{tBu2}ArO,I^*)TiCl_2$, normalised for clarity with melting temperature, Tm, annotated. Polymerisation conditions: $[Al_{sMAO}]_0/[Ti]_0=200$, TIBA (150 mg), ethylene (2 bar), pre-catalyst (10 mg), hexanes (50 mL), 1-octene (× μL), 30 minutes, and 60° C.
Figure 18:
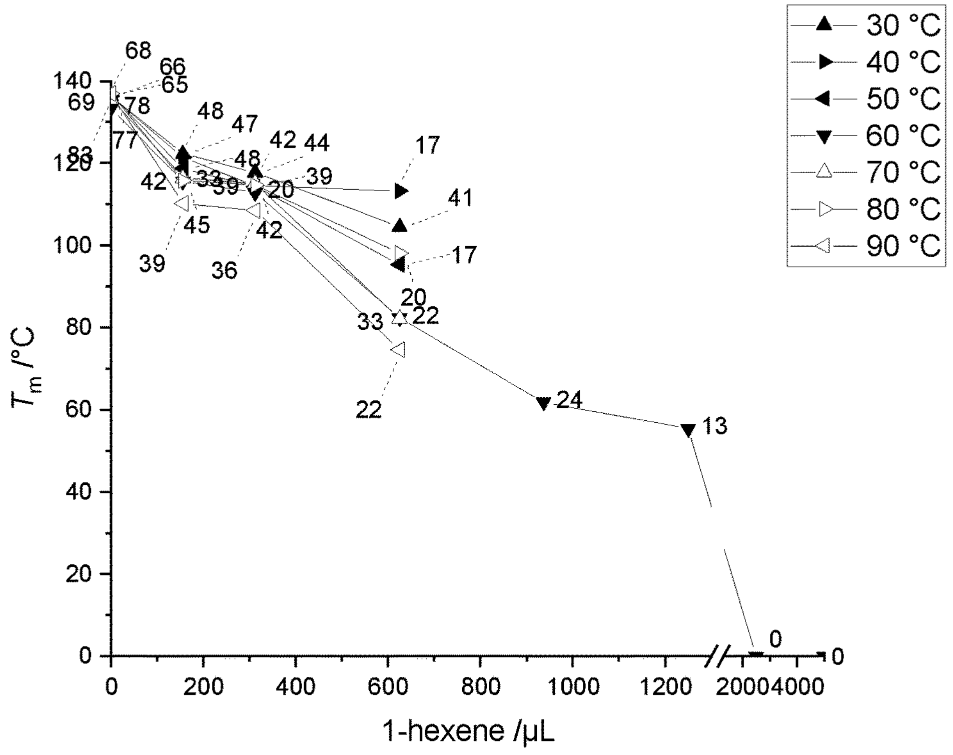
FIG. 18 shows melting temperature (Tm) as a function of quantity of 1-hexene, with crystallinity annotated. Amorphous samples with 0% crystallinity do not have a Tm.

A significant reduction in polymer melting temperature was observed, to 90.54° C. with 1250 μL 1-octene along with a partial loss of crystallinity (see FIG. 17). The effect of 1-hexene quantity on the melting temperature of the copolymer is shown in FIG. 18

Figure 19A:
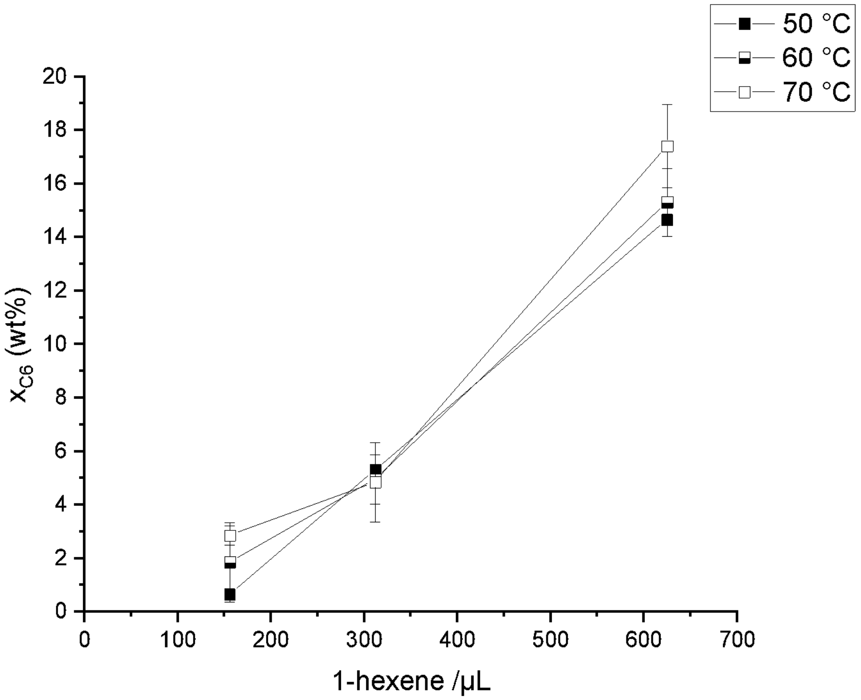
FIGS. 19A and 19B show LAO incorporation in LLDPE produced by of sMAO-$^{Me2}SB(^{tBu2}ArO,I^*)TiCl_2$ as a function of comonomer volume. Polymerisation conditions: $[Al_{MAO}]_0/[Ti]_0=200$, TIBA (150 mg), ethylene (2 bar), pre-catalyst (10 mg), hexanes (50 mL), LAO (× μL), 30 minutes, and either 50° C. (filled square), 60° C. (half-filled square), or 70° C. (open square).
Figure 19B:
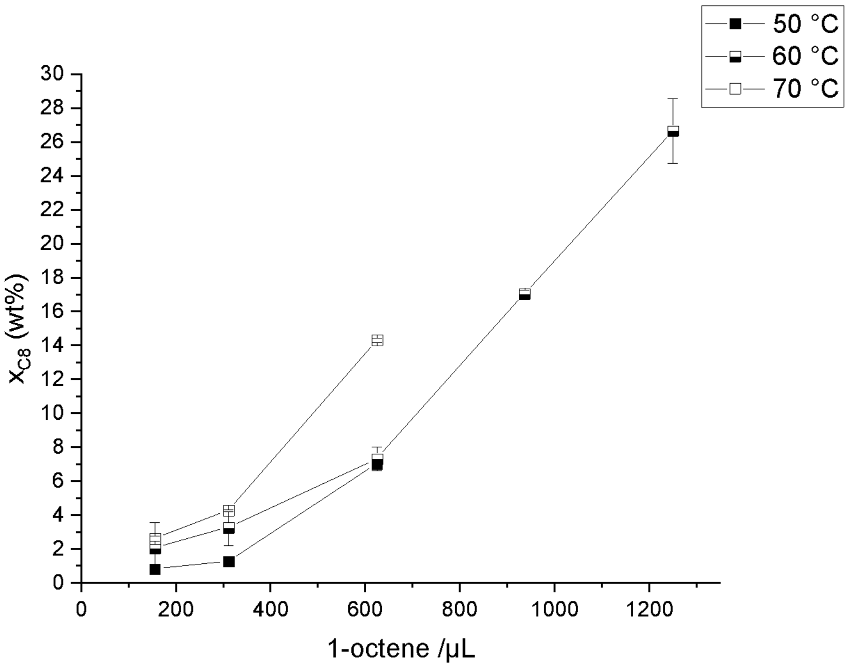

Comonomer incorporation was measured by both GPC-IR and high temperature solution-phase $^{13}C\{^1H\}$ NMR and shows an approximately linear increase in the comonomer incorporation with increasing comonomer loading (see FIGS. 19A and 19B). 1-octene incorporation was measured by high temperature solution-phase $^{13}C\{^1H\}$ NMR and shows an approximately linear increase in the number of branches per 1000 carbon with increasing comonomer loading (see FIG. 20). FIGS. 21 and 22 show the effect of 1-hexene and 1-octene comonomer amount on the molecular weight and polydispersity of the resulting copolymer when conducted at different polymerisation temperatures.

Ethylene-propylene copolymerisation was performed with sMAO-$^{Me2}$SB($^{tBu2}$ArO,I*)$TiCl_2$ at 60° C. with MAO as co-catalyst ($[Al_{MAO}]/[Ti]_0=1000$). Ethylene-propylene rubber (EPR) was synthesised with an activity of 547.7 $kg_{EPR}\ mol_{Ti}^{-1}\ h^{-1}\ bar^{-1}$, with 31 mol % incorporation of propylene into the polymer as determined by high temperature $^{13}C$ NMR (see FIG. 31). FIG. 32 shows a gel permeation chromatogram of EPM.

Effect of Hydrogen

The hydrogen response of sMAO-$^{Me_2}$SB($^{tBu_2}$ArO,I*)$TiCl_2$ was investigated by performing polymerisations using a 98:2 ethylene:hydrogen feed gas. While polymerisation activity was moderately reduced, a substantial decrease in molecular weight was observed (see FIGS. 23A and 23B)

Polyethylene Properties

The physical properties of the UHMWPE synthesised by PHENI* catalysts were studied by a variety of methods (see FIGS. 24 to 29). TGA shows a single mass-loss event at approximately 470° C. (see FIG. 25).

Density was measured according to ISO 1183, and was found to be 930 kg $m^{-3}$.

Thermal annealing demonstrates the formation of substantially disentangled UHMWPE, with the lowest entanglement density observed in the nascent polyethylene synthesised by sMAO-supported PHENI* catalysts. Slurry-phase polymerisations using sMAO led to the production of substantially disentangled UHMWPE (disUHMWPE) as evidenced by the rapid formation of two melting peaks (at approximately 135 and 142° C.), with the low temperature peak increasing at the expense of the high temperature peak as annealing time is increased. The high melting peak results from remaining nascent crystals while the low melting peak arises from the melt-crystallised portion formed from sequential chain detachment during annealing. For a given $M_w$ a more rapid increase in the normalised area of the low melting peak is indicative of a more disentangled polymer (see FIGS. 28A and 28B)

Disentangled UHMWPE was confirmed through rheological measurements, where a build-up of the storage modulus is consistent with reduced entanglement density in the nascent polymer (see FIGS. 29A and 29B)

While specific embodiments of the invention have been described herein for the purpose of reference and illustration, various modifications and variants will be apparent to a person skilled in the art without departing from the scope of the invention.

REFERENCES

1 D. F. Shriver and M. A. Drezdon, *The Manipulation of Air-Sensitive Compounds,* 2 edn., Wiley, 1986.
2 J. Cosier and A. M. Glazer, *J. Appl. Crystallogr.,* 1986, 19, 105-107.
3 U. K. L. Oxford Diffraction Agilent Technologies, Yarnton, England.
4 A. Altomare, G. Cascarano, C. Giacovazzo, A. Guagliardi, *J. Appl. Crystallogr.,* 1993, 26, 343-350.
5 L. Palatinus and G. Chapuis, *J. Appl. Crystallogr.,* 2007, 40, 786-790.
6 L. Farrugia, *J. Appl. Crystallogr.,* 1999, 32, 837-838.
7 A. L. Spek, *J. Appl. Crystallogr.,* 2003, 36, 7-13.
8 L. J. Farrugia, *J. Appl. Crystallogr.,* 2012, 45, 849-854.
9 C. Görl, E. Betthausen, H. G. Alt, *Polyhedron,* 2016, 118, 37-51.

The invention claimed is:

1. A compound having a structure according to Formula I shown below:

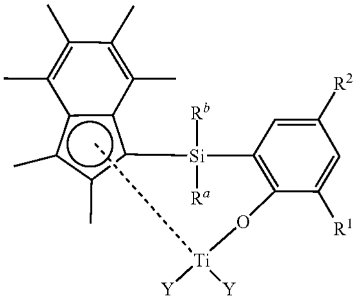

(I)

wherein $R^1$ and $R^2$ are each independently selected from the group consisting of hydrogen, (1-6C)alkyl, (1-6C)haloalkyl, (1-6C)alkoxy, (2-6C)alkenyl, (2-6C)alkynyl, $—NR^3R^4$ and $—(O)_n—(CR^5R^6)_m—R^7$, where n is 0 or 1, m is 0 or 1, $R^3$ and $R^4$ are independently selected from hydrogen or (1-3C)alkyl, $R^5$ and $R^6$ are each independently hydrogen or (1-2C)alkyl, and $R^7$ is selected from the group consisting of aryl, heteroaryl, carbocyclyl and heterocyclyl, and where $-R^7$ is optionally substituted with one or more groups $R^8$ selected from the group consisting of halo, hydroxy, (1-4C)alkyl, (1-4C)haloalkyl and (1-3C)alkoxy;

$R^a$ and $R^b$ are each independently selected from (1-4C) alkyl, (2-4C)alkenyl or aryl;

each Y is independently selected from the group consisting of hydride, halo, (1-5C)alkyl, (1-5C)alkoxy, $—(CH_2)_pSi(R^9)_3$, $—NR^{10}R^{11}$, and $—(O)_q—(CR^{12}R^{13})_r—R^{14}$, where p is 1 or 2, q is 0 or 1, r is 0 or 1, each $R^9$ is independently (1-3C)alkyl, $R^{10}$ and $R^{11}$ are independently selected from hydrogen or (1-3C) alkyl, $R^{12}$ and $R^{13}$ are independently selected from hydrogen or (1-2C)alkyl, and $R^{14}$ is selected from the group consisting of aryl, heteroaryl, carbocyclyl and heterocyclyl, and where each $R^{14}$ is optionally substituted with one or more groups $R^{15}$ selected from the group consisting of halo, hydroxy, (1-4C)alkyl, (1-4C) haloalkyl and (1-3C)alkoxy.

2. The compound of claim 1, wherein $R^1$ and $R^2$ are each independently selected from the group consisting of hydrogen, (1-5C)alkyl, (1-5C)alkoxy and $—(O)_n—(CR^5R^6)_m—R^7$.

3. The compound of claim 1, wherein $R^7$ is selected from the group consisting of phenyl and 5-6 membered heteroaryl, wherein said 5-6 membered heteroaryl contains 1 or 2 nitrogen heteroatoms.

4. The compound of claim 1, wherein $R^7$ is phenyl.

5. The compound of claim 1, wherein $R^8$ is selected from the group consisting of halo and (1-3C)alkyl.

6. The compound of claim 1, wherein $R^1$ and $R^2$ are each independently selected from the group consisting of hydrogen, methyl, tert-butyl and $—C(CH_3)_2Ph$, where Ph denotes phenyl.

7. The compound of claim 1, wherein $R^a$ and $R^b$ are methyl.

8. The compound of claim 1, wherein p is 1 and $R^9$ is methyl, $R^{10}$ and $R^{11}$ are independently selected from (1-3C) alkyl, and $R^{12}$ and $R^{13}$ are hydrogen.

9. The compound of claim 1, wherein $R^{14}$ is selected from the group consisting of phenyl and 5-6 membered heteroaryl, wherein said 5-6 membered heteroaryl contains 1 or 2 nitrogen heteroatoms.

10. The compound of claim 1, wherein each Y is independently selected from the group consisting of chloro, bromo, iodo, methyl, $—CH_2Si(CH_3)_3$, $—N(CH_3)_2$ and —O-2,6-diisopropylphenyl.

11. The compound of claim 1, wherein Y is chloro.

12. The compound of claim 1, wherein the compound is supported on a supporting substrate selected from the group consisting of silica, layered double hydroxide, silica-supported methylaluminoxane, layered double hydroxide-supported methylaluminoxane and solid polymethylaluminoxane.

13. A process for the preparation of a polyolefin, the process comprising contacting at least one olefin with a compound of having a structure according to Formula I as defined in claim 1.

14. The process of claim 13, wherein the at least one olefin is ethylene such that the polyolefin is a polyethylene homopolymer.

15. The process of claim 13, wherein the at least one olefin is a mixture of ethylene and another α-olefin having 3 to 10 carbon atoms, such that the polyolefin is a copolymer.

16. The process of claim 15, wherein the other α-olefin is selected from 1-hexene and or 1-octene.

17. The process of claim 15, wherein greater than 60% of repeating units within the copolymer are derived from polymerisation of ethylene.

18. The process of claim 13, wherein the compound of having a structure according to Formula I is unsupported and the process is conducted in solution phase.

19. The process of claim 13, wherein the compound of having a structure according to Formula I is supported on a supporting substrate and the process is conducted in slurry phase.

20. The process of claim 13, wherein the process is conducted in the presence of an organo aluminium compound.

* * * * *